US006741547B2

(12) United States Patent
Tomura et al.

(10) Patent No.: US 6,741,547 B2
(45) Date of Patent: May 25, 2004

(54) OPTICAL RECORDING MEDIUM HAVING SHORT WOBBLE PERIOD LENGTH

(75) Inventors: Tatsuya Tomura, Tokyo (JP); Tsutomu Satoh, Yokohama (JP); Noboru Sasa, Yokohama (JP); Soh Noguchi, Yokohama (JP); Yasunobu Ueno, Yokohama (JP); Yasuhiro Higashi, Sendai (JP)

(73) Assignee: Ricoh Company, Ltd., Tokyo (JP)

( * ) Notice: Subject to any disclaimer, the term of this patent is extended or adjusted under 35 U.S.C. 154(b) by 237 days.

(21) Appl. No.: 09/925,425

(22) Filed: Aug. 9, 2001

(65) Prior Publication Data

US 2002/0048646 A1 Apr. 25, 2002

(30) Foreign Application Priority Data

| Aug. 10, 2000 | (JP) | 2000-243157 |
| Sep. 6, 2000 | (JP) | 2000-270833 |
| Oct. 5, 2000 | (JP) | 2000-306808 |
| Oct. 5, 2000 | (JP) | 2000-306809 |
| Oct. 5, 2000 | (JP) | 2000-306810 |
| Jan. 25, 2001 | (JP) | 2001-017483 |
| Feb. 5, 2001 | (JP) | 2001-028845 |
| Mar. 23, 2001 | (JP) | 2001-084738 |
| Mar. 30, 2001 | (JP) | 2001-097847 |
| Mar. 30, 2001 | (JP) | 2001-099870 |

(51) Int. Cl.[7] ............................................. G11B 7/24
(52) U.S. Cl. ................................. 369/275.4; 428/64.8
(58) Field of Search ...................... 369/275.3, 275.4, 369/277, 278, 279, 275.2; 428/64.1, 64.3, 64.4, 64.8; 430/320, 321, 270.13

(56) References Cited

U.S. PATENT DOCUMENTS

| 4,774,522 A | 9/1988 | Van Tongeren et al. | |
| 4,998,237 A | 3/1991 | Osakabe et al. | |
| 5,038,338 A | 8/1991 | Terao et al. | |
| 5,109,373 A | 4/1992 | Ohno et al. | |
| 5,508,985 A | * 4/1996 | Fairchild et al. | 369/275.3 |
| 6,101,158 A | * 8/2000 | Hogan | 369/275.3 |
| 6,324,136 B1 | * 11/2001 | Yoshida et al. | 369/275.3 |
| 6,501,721 B2 | * 12/2002 | Hogan | 369/275.3 |
| 6,556,523 B1 | * 4/2003 | Masui | 369/275.3 |

FOREIGN PATENT DOCUMENTS

| EP | 1-001-409 A2 * | 5/2000 | 369/275.3 |
| JP | 5736439 | 2/1988 | |
| JP | 63302424 | 12/1988 | |

* cited by examiner

*Primary Examiner*—Tan Dinh
(74) *Attorney, Agent, or Firm*—Cooper & Dunham LLP

(57) ABSTRACT

An optical recording medium having a disk-like substrate and a recording layer provided over the substrate and containing at least one organic dye. The substrate has a wobble with a period length PL in the range of 4T to 96T.

84 Claims, 5 Drawing Sheets

Multi-Pulse Light Emission Wave Form

OPTICAL RECORDING MEDIUM HAVING SHORT WOBBLE PERIOD LENGTH

BACKGROUND OF THE INVENTION

This invention relates to a high-capacity optical recording medium, such as CD-I, CDV or DVD-R (digital video disk-recordable or digital versatile disk-recordable), which is capable of recording and reproducing data by means of a laser beam.

Recently, an increase in the amount of information, data demands a high-density storage media which permits a recording/playback of a vast amount of information rapidly. Thus, as next-generation high-capacity disc systems, development of DVD-R are currently investigated on various aspects such as recording materials capable of using very small recording pits, image compression technique such as MPEG2 (motion picture experts group), and laser diodes emitting light having short wavelength for reading small recorded pits.

As for the laser diodes emitting light in the red region, AlGaInP laser diodes, which emit light having a wavelength of 670 nm, have been developed for commercial operation and used for bar code readers and measuring instruments. With the capacity of optical discs increased, red color laser diodes have been used in the optical data storage field. In a case of DVD drives, light within the 630–670 nm band, which is emitted by laser diodes, is standardized as a light source. As for the read-only DVD-ROM (digital video disc-read-only-memory) drives, drives using light having a wavelength of 650 nm or less are marketed.

In this circumstance, DVD-Rs capable of recording and reproducing data with a laser beam having a wavelength of 630–670 nm and having excellent light resistance, storage stability and surface uniformity are desired. Until now, however, such DVD-Rs have not yet been developed.

Land prepit format using a land prepit signal (Lppb) of 0.16–0.32 has been generally adopted for DVD-R format. This method, however, has a problem because the cutting width of the recording material should be finely controlled using a finely fabricated stamper, etc.

The storage capacity of optical disk devices can be increased by employing a constant linear velocity (CLV) method. The CLV method, however, needs a slow access time. The access time can be shorten by employing a constant angular velocity (CAV) method or a zone constant angular velocity (ZCAV) method. Since DVDs are in the form of disks, the linear velocity increases from inside tracks to ouside tracks. It is, therefore, necessary to control the recording pulse length as well as recording power in order to adopt CAV or ZCAV system for spinning DVD-R disks.

BRIEF SUMMARY OF THE INVENTION

It is an object of the present invention to provide an optical recording medium which has an organic dye-containing recording layer and which has a new wobbling format.

Another object of the present invention is to provide a DVD-R disk which does not require such fine control of cutting operation by a stamper as adopted in the case of land prepit format and which is adapted for a CAV or ZVAV disk spinning system.

It is a further object of the present invention to provide a DVD-R disk having improved light resistance.

It is yet a further object of the present invention to provide an optical recording method by multipulse recording or rectangular wave recording.

In accomplishing the above objects, the present invention provides an optical recording medium comprising a disk-like substrate and a recording layer provided over said substrate and containing at least one organic dye, said substrate having a wobble with a period length PL in the range of 4T to 96T.

In one embodiment, the recording layer contains at least two organic dyes one of which, when formed by itself into a film, has a maximum absorption wavelength greater than those of the other dyes and a refractive index greater than those of the other dyes.

In another embodiment, the recording layer, when formed by itself into a film, has a refractive index in the range of 1.5 to 3.0 and an extinction coefficient in the range of 0.02 to 0.2 both at a wavelength between ±5 nm from the reproducing wavelength.

In a further embodiment, the substrate has a groove depth $d1$ (Å) satisfying the following relationship:

$$4000 \leq (d1) \times (PL) \leq 240000$$

where PL is as defined above.

In a further embodiment, the substrate has a wobble amplitude increasing in the radial direction.

In yet a further embodiment, the substrate has a guide groove depth increasing in the radial direction.

BRIEF DESCRIPTION OF THE DRAWINGS

Other objects, features and advantages of the present invention will become apparent from the detailed description of the preferred embodiments which follows, when considered in the light of the accompanying drawings, in which.

DETAILED DESCRIPTION OF THE PREFERRED

Embodiments of the Invention

Figure 1A:
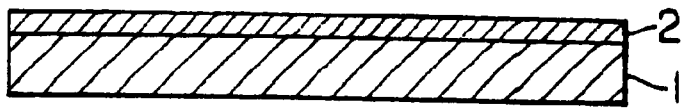
FIGS. 1A to 1D are schematic cross-sectional views which show examples of the optical recording medium according to the present invention as a WORM disk.

An optical recording medium of the present invention has a disk-like substrate provided with a spiral or concentric-shaped groove structure along tracks formed thereon. The groove structure is formed with a wobble in a fixed cycle in a radial direction, the fixed cycle of the wobble continuing in the circumferential direction along the track. In the present invention, a wobble period length of 4T-96T is adopted. "T" represents a recording pit length recorded using a basic clock frequency. In the case of a DVD recording medium of 4.7 GB (gigabytes), for example, the basic clock frequency is 38.2 ns and T is about 0.133 μm and, therefore, the range 4T-96T corresponds to about 0.53–12.8 μm.

Hitherto a wobble period length of 150T to 400T has been adopted. Such a low frequency (long period length) wobbling has been found to be ill-suited for high density recording, because relatively a long interval is present between the existing data and a data to be newly recorded. By adopting the specific high frequency wobble format (wobble period length of 4T-96T) in the present invention, it is possible to modulate the wobble for synchronization. Therefore, it is no longer required to use Lppb signal so that fine control of a stamper is not needed.

When the track control is performed with a push-pull amplitude PP, it is preferred that the optical recording disk have such a wobble amplitude Wo that provides a ratio Wo/PP in the range of 0.1 to 0.4, more preferably 0.15–0.3 for proper synchronization and prevention of data errors. The push pull amplitude PP and the wobble amplitude Wo may be determined after passage through suitable filters.

A multi-pulse light may be used for forming record marks in the optical recording medium of the present invention. In such a multipulse system, two or more pulse series are used for forming various mark lengths. Since long marks can be formed without excessive heating, thermal load can be reduced and record marks can be precisely recorded. In this case, the recording power and the light-emission power in each pulse are preferably controlled according to the recording position or the recording linear velocity. Multipulse recording is described in, for example, U.S. Pat. Nos. 5,109,373, No. 5,038,338 and No. 4,774,522 disclosure of which is hereby incorporated by reference herein.

Formation of record marks may also be made by so-called rectangular wave recording using continuous light emission. In this case, since there are no inter-pulse spacing, it is possible to reduce or omit the control of pulse length (FIGS. 4(a) and 4(b), $dT_{top}$ and $dT_{era}$), though the control of the recording power (P1) is required. Because the recording power in the rectangular wave recording is reduced to 80–90% of the recording power in the multi-pulse recording, the high speed recording can be carried out more easily. Rectangular wave recording is described in, for example, JP-B-S62-11411 (JP-A-S57-36439), JP-B-H06-5576 (JP-A-S63-302424) and U.S. Pat. No. 4,998,237, disclosure of which is hereby incorporated by reference herein.

In either of the multi-pulse and rectangular wave recording systems, the CAV or ZCAV systems may be adopted for the purpose of the present invention.

Figure 1B:
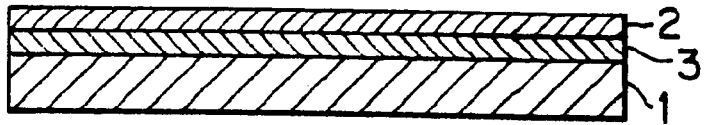
Figure 1C:
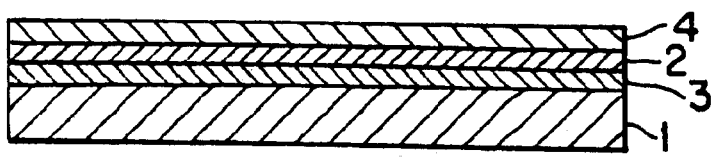
Figure 1D:
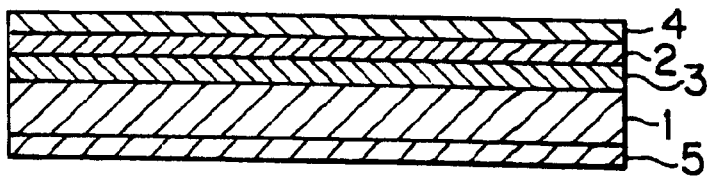

FIGS. 1A to 1D show schematic cross-sectional views which show structural examples of an optical recording medium of the present invention, which can be used as a write once read many (WORM) type optical disk. The recording medium of the present invention shown in FIG. 1A comprises a substrate 1 and a recording layer 2 which is provided on the substrate 1. The recording medium of the present invention shown in FIG. 1B is the same as the recording medium shown in FIG. 1A except that an undercoat layer 3 is interposed between the substrate 1 and the recording layer 2. The recording medium of the present invention shown in FIG. 1C is the same as the recording medium shown in FIG. 1B except that a protective layer 4 is overlaid on the recording layer 2. The recording medium of the present invention shown in FIG. 1D is the same as the recording medium shown in FIG. 1C except that a hard coat layer 5 is provided on the back side of the substrate 1, opposite to the side of the undercoat layer 3 with respect to the substrate 1.

Figure 2A:
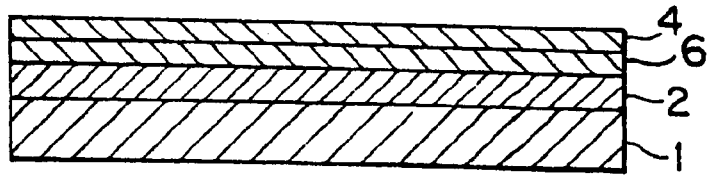
FIGS. 2A to 2C are schematic cross-sectional views which show another examples of the optical recording medium according to the present invention which is suitable for the CD-R.
Figure 2B:
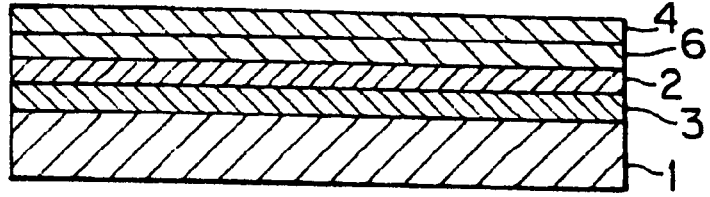
Figure 2C:
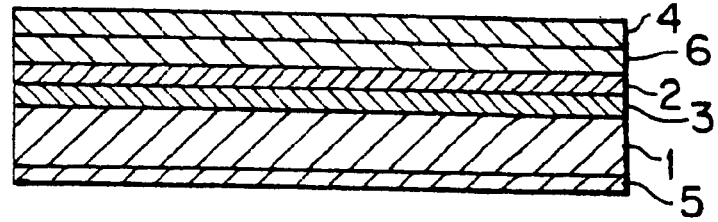

FIGS. 2A to 2C are schematic cross-sectional views showing the structure of an optical recording medium according to the present invention, which can be used as a recording medium for the CD-R. The recording medium of the present invention shown in FIG. 2A comprises a substrate 1, and a recording layer 2, a reflection layer 6 and a protective layer 4 which are successively overlaid on the substrate 1. The recording medium of the present invention shown in FIG. 2B is the same as the recording medium shown in FIG. 2A except that an undercoat layer 3 is interposed between the substrate 1 and the recording layer 2. The recording medium of the present invention shown in FIG. 2C is the same as the recording medium shown in FIG. 2B except that a hard coat layer 5 is provided on the back side of the substrate 1, opposite to the side of the undercoat layer 3 with respect to the substrate 1.

Figure 3A:
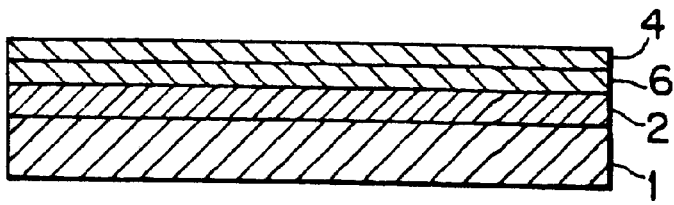
FIGS. 3A to 3C are schematic cross-sectional views which show further examples of the optical recording medium according to the present invention which is suitable for the DVD-R (digital video disc-recordable)
Figure 3B:
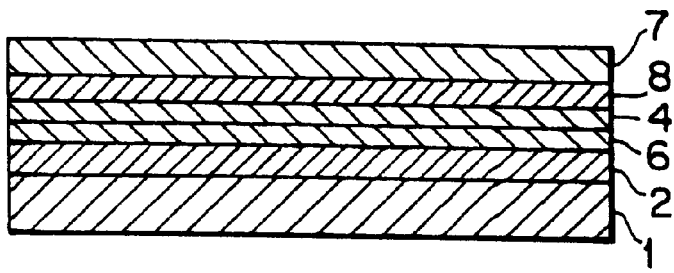
Figure 3C:
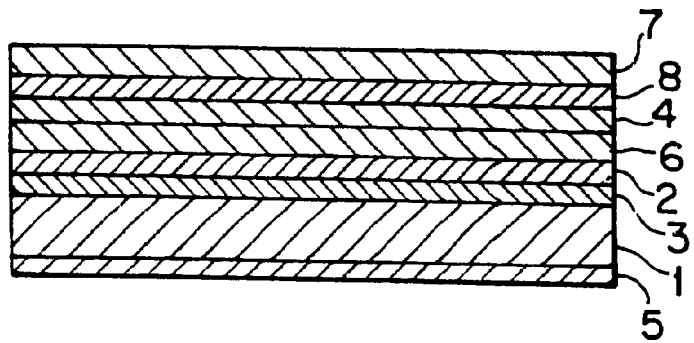

FIGS. 3A to 3C are schematic cross-sectional views showing the structure of the optical recording medium according to the present invention, which can be used as-a recording medium for a DVD-R. The recording medium shown in FIG. 3A is the same as that shown in FIG. 2A in terms of the structure. The recording medium shown in FIG. 3B is the same as the recording medium shown in FIG. 2A except that a protective substrate 7 is attached to the protective layer 4 with an adhesive layer 8. The recording medium shown in FIG. 3C is the same as the recording medium shown in FIG. 2C except that a protective substrate 7 is attached to the protective layer 4 with an adhesive layer 8.

An optical recording medium of the present invention can also be constructed by superimposing any two of the above-mentioned recording media in such a manner that the recording layers of the two recording media are positioned inside so as to face each other with an air gap therebetween in a sealed air-sandwich structure, or by laminating the two recording media in the above-mentioned posture, but through the protective layer.

Required properties or characteristics and materials for each of the above-mentioned layers of the optical recording medium of the present invention will now be explained.

(1) Substrate

When recording and reproduction are carried out at the substrate side, it is required that the substrate be transparent to the laser beam employed for the recording and reproduction. However, such transparency is unnecessary when recording and reproduction are carried out at the recording layer side.

Examples of the material for the substrate are plastics such as polyester, acrylic resin, polyamide, polycarbonate resin, polyolefin resin, phenolic resin, epoxy resin and polyimide; glass; ceramics; and metals. A guide groove or guide pit for tracking may be formed on the surface of the substrate. Furthermore, preformats for address signals and the like may also be formed on the surface of the substrate.

It is preferred that the substrate have a track pitch of 0.64–0.8 μm for reasons of increased recording capacity and a groove width of 0.18–0.40 μm in terms of a half value width for reasons of obtaining sufficient tracking error signals while ensuring proper recording. The groove depth is generally 1000–2500 Å.

It is preferred that the substrate have a groove depth d1 (Å) satisfying the following relationship:

$$4000 \leq (d1) \times (PL) \leq 240000$$

where PL is as defined above.

It is also preferred that the optical recording disk have a land-groove distance d2 (Å) satisfying the following relationship:

$$1200 \leq (d2) \times (PL) \leq 160000.$$

The distance d2 is a distance between the top of the land and the bottom of the groove when the recording layer is provided on the substrate.

It is also preferred that the substrate have a groove width W1 (μm), in terms of half value width, satisfying the following relationship:

$$0.7 \leq (W1) \times (PL) \leq 40.$$

It is also preferred that the substrate have a wobble amplitude W2 (Å) satisfying the following relationship:

$$2 \leq (W2)/(PL) \leq 500.$$

It is also preferred that the substrate have a track pitch Tr (μm) satisfying have the following relationship:

$$2 \leq (Tr) \times (PL) \leq 80.$$

The substrate may be produced by conventional injection molding using a stamper. In such a method, a molten resin such as polycarbonate resin is injected into a mold cavity provided with a stamper toward the center of the stamper and spread toward the outer periphery of the stamper. Thus, a relatively long time is required in order to uniformly distribute the molten resin throughout the stamper surface and to ensure uniform wobble signal reliability throughout the grooved surface of a replica substrate produced by the injection molding.

It has been found that the use of a stamper having a surface providing such guide grooves on a replica substrate that have a wobble period length of 4T-96T and a wobble amplitude increasing in the radial direction is effective to obtain uniform wobble signals and tracking signals throughout the disk with high reliability.

Especially when a ratio of the highest wobble amplitude Wo to the lowest wobble amplitude Wi (Wo/Wi ratio) is 1.05 or more, a replica substrate giving uniform wobble signals and tracking signals can be obtained even when a short tact time of less than 10 seconds is used for the production thereof. Too large a Wo/Wi ratio in excess of 1.40 is, however, undesirable because the recording characteristics are adversely affected. For example, with such an excessively large Wo/Wi ratio, it is necessary that the recording should be carried out on the center of the track, since the zitter becomes poor when a track offset is large.

The increase of the wobble amplitude from the inner groove to the outer groove may be continuous or stepwise. For example, the wobble amplitude may be continuously increased from the innermost groove to the outermost groove. Alternatively, one or more selected portions between the innermost groove and the outermost groove may be continuously increased in the radial direction, with the remainder portion or portions being maintained unchanged.

It has been also found that the use of a stamper having a surface providing such guide grooves on a replica substrate that have a wobble period length of 4T-96T and a groove depth increasing in the radial direction is effective to obtain uniform wobble signals and tracking signals throughout the disk with high reliability. In this case, groove width may also be suitably designed to increase in the radial direction.

Especially when a ratio of the largest depth Do to the smallest depth Di (Do/Di ratio) is 1.1 or more, a replica substrate giving uniform wobble signals and tracking signals can be obtained even when a short tact time of less than 10 seconds is used for the production thereof. Too large a Do/Di ratio in excess of 1.70 is, however, undesirable because the uniformity is adversely affected. The preferred Do/Di ratio is in the range of 1.3–1.6. The groove width is preferably such that the ratio of the largest width GWo to the smallest depth GWi (GWo/GWi ratio) is 1.05–1.5, more preferably 1.1–1.3.

The increase of the groove depth (width) from the inner groove to the outer groove may be continuous or stepwise. For example, the groove depth (width) may be continuously increased from the innermost groove to the outermost groove. Alternatively, one or more selected portions between the innermost groove and the outermost groove may be continuously increased in the radial direction, with the remainder portion or portions being maintained unchanged.

(2) Recording Layer

Information is recorded in the recording layer in such a manner that some optical changes are caused in the recording layer by the application of a laser beam thereto. The recording layer one or more dyes. Examples of the dyes include azo dyes inclusive of azo metal chelate dyes, formazane dyes inclusive of formazane metal chelate dyes, dipyrromethene dyes inclusive of dipyrromethene dyes, polymethine dyes, squarylium dyes and azaannulene dyes.

Azo dyes may be those represented by the formula R—N=N—R' in which R and R' stand independently from each other for a substituted or non-substituted aromatic group, pyridine residue, pyrimidine residue, pyrazine residue, pyridazine residue, triazine residue, imidazole residue, thiazole residue, isothiazole residue or benzthiazole residue. Metal chelates of the above azo compounds are preferably used.

Formazane dyes may be those represented by the formula:

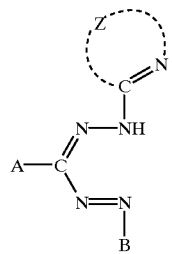

wherein A stands for an alkyl group, aralkyl group, an aryl group or a cycloalkyl group each of which may have a substituent such as an alkyl group, an alkoxyl group, a halogen group, a keto group, a carboxyl group, a carboxylate group, a nitrile group or a nitro group; B stands for an aryl group which may have a substituent such as an alkyl group, an alkoxyl group, a halogen group, a carboxyl group, a carboxylate group, a nitrile group or a nitro group; and Z stands for a residue which is linked to —C=N— to form a heterocyclic ring, such as a pyridazine ring, a pyrimidine ring, a pyrazine ring or a triazine rifle, which may have a substituent such as an alkyl group, an alkoxyl group, an alkylthio group, a substituted amino group, an aryl group, an aryloxy group, anilino group or a keto group.

Dipyrromethene dyes may be those represented by the formula:

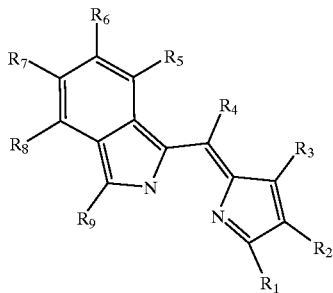

wherein $R_1$ through $R_9$ stand, independently from each other, for a hydrogen atom, an alkyl group, an alkoxyl group, an alkenyl group, an acyl group, an alkoxycarbonyl group, aryl group or a heteroaryl group each of which groups may have a substituent such as an alkyl group, an alkoxyl group, a halogen group, a keto group, a carboxyl group, a carboxylate group, a nitrile group or a nitro group.

The above azo compounds, formazane compounds and dipyrromethene compounds are preferably in the form of a metal chelate. The metal is generally a transition metal such as Ni, Co, Cu, Mn, V, Zn, Fe, Cr or Al, preferably Ni, Co, Cu, Mn or V for reasons of easiness of preparation and for improved disk properties. The metal is preferably a divalent metal.

The polymethine dyes having an absorption band in the range of 530–600 nm are suitably used. Trimethinecyanine dyes having an indolenine or benzindolenine group at their termini are preferably used. Counter-anion may be halogen ion, $ClO_4^-$, $BF_4^-$, $PF_6^-$, $SbF_6^-$ or an anion of a metal chelate such as nickel dithiolate complex.

The squarylium dyes may be squaric acid compounds having two groups which may be, independently from each other, substituted or non-substituted indolenine, substituted or non-substituted benzindolenine, substituted or non-substituted pyrazole, substituted or non-substituted carbazole, substituted or non-substituted quinoxaline, substituted or non-substituted isoindole, substituted or non-substituted aromatic rings, substituted amino groups. Suitable squarylium dyes are tetrapyridinoporphyrin, tetrapyridinoporphyrazin, tetrapyrazinoporphirazin and phthalocyanin.

It is preferred that the recording layer contains at least two organic dyes one of which, when formed by itself into a film, has a maximum absorption wavelength greater than those of the other dyes and a refractive index greater than those of the other dyes. By using two or more dyes in combination, dependency of recording power on recording wavelength can be reduced. In this case, high reflectance can be obtained when one of the dyes has a greater maximum absorption wavelength than those of the other dyes and a greater refractive index than those of the other dyes. Such a dye having higher maximum absorption wavelength and higher reflectance may be a polymethine dye (inclusive of a methine dye) such as a cyanine dye or a styryl dye. The polymethine dye, however, has a low light resistance. When the polymethine dye is used in conduction with a metal chelate dye such as an azo metal chelate dye, a formazane metal chelate dye or a dipyrromethene metal chelate dye, the resulting recording layer has both high reflectance and high light resistance. The mixing ratio of the polymethine dye to the metal chelate dye is preferably 1:9 to 9:1, more preferably 3:7 to 8:2.

The recording layer preferably has a decomposition initiation temperature of 360° C. or less.

Examples of polymethine dyes and metal chelate dyes are shown in Tables 1–5 below.

TABLE 1

| Compound | Cyanine dye | Counter ion |
|---|---|---|
| A-1 | | $ClO_4^-$ |
| A-2 | | $PF_6^-$ |

TABLE 1-continued

| Compound | Cyanine dye | Counter ion |
|---|---|---|
| A-3 | (structure: indolinium–CH=CH–CH=benz[e]indoline; N-CH₃ and N-C₄H₉; gem-dimethyls) | $ClO_4^-$ |
| A-4 | (structure: 5-methylindolinium–CH=CH–CH=benz[e]indoline; N-CH₃ and N-CH₃) | $SbF_6^-$ |
| A-5 | (structure: benz[e]indolinium–CH=CH–CH=benz[e]indoline; both N-C₄H₉) | $I^-$ |
| A-6 | (structure: 5-methoxyindolinium–CH=CH–CH=benz[e]indoline; N-CH₃ and N-C₂H₅) | $BF_4^-$ |
| A-7 | (structure: 5-methoxyindolinium–CH=CH–CH=benz[e]indoline; both N-C₄H₉) | Co complex of bis-azo ligand with NO₂ and N(C₂H₅)₂ substituents |

TABLE 2

| Compound | Styryl dye | Counter ion |
|---|---|---|
| B-1 | (structure: 3,3-dimethyl-1-ethylindolinium–CH=CH–C₆H₄–N(CH₃)₂) | $ClO_4^-$ |

TABLE 2-continued
| Compound | Styryl dye | Counter ion |
|---|---|---|
| B-2 | 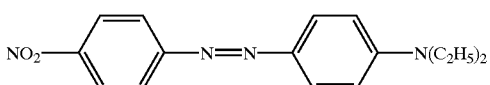 | $PF_6^-$ |
| B-3 | | — |
| B-4 | | $SbF_6^-$ |
| B-5 | | $I^-$ |
| B-6 | | $BF_4^-$ |
| B-7 | | $ClO_4^-$ |
TABLE 3
| Compound | Azo metal chelate dye | Center metal |
|---|---|---|
| C-1 | 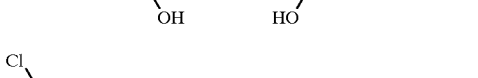 | Co |
| C-2 | | Cu |

TABLE 3-continued

| Compound | Azo metal chelate dye | Center metal |
|---|---|---|
| C-3 | pyrimidine—N=N—phenyl(NHSO$_2$CF$_3$)—N(C$_3$H$_7$)$_2$ | Ni |
| C-4 | pyridine—N=N—phenyl(NHCOPh)—N(C$_2$H$_5$)$_2$ | Mn |
| C-5 | 4-phenylthiazole—N=N—phenyl(COOH)—N(C$_2$H$_5$)$_2$ | VO |
| C-6 | 4,6-diphenyl-1,3,5-triazine—N=N—phenyl(NHSO$_2$C$_2$H$_5$)—N(C$_2$H$_5$)$_2$ | Cu |
| C-7 | 4,5-dicyanoimidazole—N=N—phenyl(NHCOC$_2$H$_5$)—N(C$_2$H$_5$)$_2$ | Ni |

TABLE 4

| Compound | Formazane metal chelate dye | Center metal |
|---|---|---|
| D-1 | pyrazine—NH—N=C(4-pyridyl)—N=N—phenyl | Ni |

TABLE 4-continued
| Compound | Formazane metal chelate dye | Center metal |
|---|---|---|
| D-2 | | Cu |
| D-3 | | Ni |
| D-4 | | Mn |
| D-5 | | Co |
TABLE 5
| Compound | Dipyrromethene metal chelate dye | Center metal |
|---|---|---|
| E-1 | 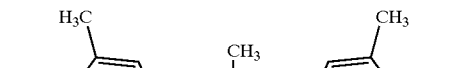 | Ni |

TABLE 5-continued

| Compound | Dipyrromethene metal chelate dye | Center metal |
|---|---|---|
| E-2 | | Cu |
| E-3 | | Ni |
| E-4 | | Co |
| E-5 | | Ni |

If desired, metal or a metal compound such as In, Te, Bi, Se, Sb, Ge, Sn, Al, Be, As, Cd, $TeO_2$ and SnO may be dispersed in combination with the above-mentioned dyes in the recording layer or prepared into a layer laminated on the recording layer.

Further, various materials, for example, polymers such as ionomer resin, polyamide resin, vinyl resin, natural polymer, silicone, and liquid rubber, or a silane coupling agent may be dispersed in combination with the previously mentioned dyes. In addition, to improve the characteristics of the recording layer, the recording layer may further comprise a stabilizer (for example, a transition metal complex), a dispersant, a fire retardant, a lubricant, an antistatic agent, a surfactant, and a plasticizer.

The recording layer can be formed by any of the conventional methods such as deposition, sputtering, chemical vapor deposition (CVD) and solvent coating. When the coating method is employed for the formation of the recording layer, the above-mentioned organic dyes and other materials may be dissolved in an organic solvent to prepare a coating liquid, and the coating liquid for the recording layer thus prepared may be coated, for instance, on the substrate by the conventional coating method such as spray coating, roller coating, dip coating, or spinner coating.

Examples of the organic solvents used for the preparation of the coating liquid for the recording layer include alcohols such as methanol, ethanol and isopropanol; ketones such as acetone, methyl ethyl ketone and cyclohexanone; amides such as N,N-dimethylacetamide and N,N-dimethylformamide; sulfoxide such as dimethylsulfoxide; ethers such as tetrahydrofuran, dioxane, diethyl ether and ethylene glycol monomethyl ether; esters such as methyl acetate and ethyl acetate; aliphatic carbon halides such as chloroform, methylene chloride, dichloroethane, carbon tetrachloride and trichloroethane; aromatic compounds such as benzene, xylene, monochlorobenzene and dichlorobenzene; cellosolves such as methoxyethanol and ethoxyethanol; and hydrocarbons such as hexane, pentane, cyclohexane and methylcyclohexane.

The recording layer have a thickness in the range of 100 Å to 10 μm, more preferably in the range of 200 Å to 2000 Å.

It is preferred that the optical recording medium of the present invention have a large absorption band over a relatively short wavelength region in a wavelength range of from 630 nm to 690 nm of the wavelength range of the recording and reproducing laser light. In this case, the laser light used for recording and reproducing information preferably has a wavelength near the upper end of the wavelength range of from 630 nm to 690 nm (i.e., in the wavelength of the reading and reproducing laser light). Such an optical recording medium has large refractive index and extinction coefficient in the wavelength range of form 630 nm to 690 nm.

In particular, the recording layer, when formed by itself into a film, preferably has a refractive index in the range of 1.5 to 3.0 and an extinction coefficient in the range of 0.02 to 0.2 both at a wavelength between ±5 nm from the reproducing wavelength. Too small a refractive index below 1.5 is insufficient to obtain high optical changes and a modulation factor in recording. It is also not preferable for the recording layer to have a refractive index of more than 3.0, because the dependency of recording and reproducing on the wavelength of the light used for recording and reproducing is excessively enhanced, and thereby a problem such as mis-recording or mis-reproducing tends to occur even when light having a wavelength in the recording and reproducing wavelength range (630 to 690 nm) is used. It is not preferable for the recording layer to have an extinction coefficient k not greater than 0.02, because the recording sensitivity deteriorates. When the extinction coefficient k of the recording layer is greater than 0.2, it is difficult to obtain reflectivity of 50% or more.

The recording layer preferably has a decomposition initiation temperature of 360° C. or less.

(3) Undercoat Layer

The undercoat layer is interposed between the substrate and the recording layer for the following purposes: (a) improving the adhesion between the substrate and the recording layer; (b) preventing the recording layer from being exposed to water and gases as a barrier layer; (c) improving the preservation stability of the recording layer; (d) increasing the reflectance of the recording layer; (e) protecting the substrate from the solvent employed; and (f) forming guide grooves, guide pits and preformats and the like.

To attain the above-mentioned purpose (a), a variety of polymeric materials such as ionomer resin, polyamide resin, vinyl resin, natural resins, natural polymeric materials, silicone and liquid rubber; and a silane coupling agent may be employed. To attain the purposes (b) and (c), inorganic compounds such as $SiO_2$, $MgF_2$, SiO, $TiO_2$, ZnO, TiN and SiN; and metals such as Zn, Cu, Ni, Cr, Ge, Se, Au, Ag and Al and semimetals can be used in addition to the above-mentioned polymeric materials. To attain the purpose (d), a metal such as Al, Au or Ag may be used for the formation of the undercoat layer; or an organic thin film exhibiting metallic luster may be formed by using, for example, methine dye or xanthene dye. To attain the purposes (e) and (f), an ultraviolet-curing resin, a thermosetting resin and a thermoplastic resin can be used for the formation of the undercoat layer.

It is preferable that the undercoat layer have a thickness in the range of 0.01 to 30 $\mu$m, more preferably in the range of 0.05 to 10 $\mu$m. The undercoat layer may further comprise auxiliary agents such as a stabilizer, a dispersant, a fire retardant, a lubricant, an antistatic agent, a surfactant, and a plasticizer.

(4) Reflection Layer

The reflection layer for use in the present invention may be made of a metal or a semimetal which exhibits high reflectance by itself and is insusceptible to corrosion. Specific examples of the metal for use in the reflection layer are Au, Ag, Al, Cr, Ni, Fe and Sn. Of these metals, Au, Ag and Al are particularly preferable in view of the reflectance and the productivity. These metals and semimetals may be used alone, or in combination to prepare an alloy. The reflection layer can be formed by the conventional film formation method such as vacuum deposition or sputtering. It is preferable that the reflection layer have a thickness in the range of 50 to 5000 Å, more preferably in the range of 100 to 3000 Å.

(5) Protective Layer and Hard Coat Layer

The protective layer is provided on the recording layer, and the hard coat layer is provided on the back side of the substrate, opposite to the recording layer side with respect to the substrate. The protective layer serves to (a) protect the recording layer (or the reflection layer) from damage, dust, and soiling, (b) improve the storage stability of the recording layer (or the reflection layer), and (c) improve the reflectance. The hard coat layer is provided to protect the rear surface of the substrate from damage, dust, and soiling. For these purposes, the same materials as used for the undercoat layer are available in the preparation of the protective layer and the hard coat layer.

For instance, specific examples of the material for the protective layer and the hard coat layer include inorganic materials, such as SiO and $SiO_2$; and organic materials, such as heat-softening and heat-fusible resins, e.g. polymethyl acrylate, polycarbonate, epoxy resin, polystyrene, polyester resin, vinyl resin, cellulose, aliphatic hydrocarbon resin, natural rubber, styrene-butadiene resin, chloroprene rubber, wax, alkyd resin, drying oil and rosin, and ultraviolet-curing resins. Of the above-mentioned resins, the ultraviolet-curing resin is most preferable for the formation of the protective layer and also for the hard coat layer, since the ultraviolet-curing resin is excellent in productivity.

It is proper that the protective layer or the hard coat layer have a thickness in the range of 0.01 to 30 $\mu$m, more preferably in the range of 0.05 to 10 $\mu$m. The protective layer and the hard coat layer may further comprise auxiliary agents such as a stabilizer, a dispersant, a fire retardant, a lubricant, an antistatic agent, a surfactant, and a plasticizer.

(6) Protective Substrate

The protective substrate is required to be transparent with respect to the lease beam to be employed when the laser beam is applied to the protective substrate side of the recording medium. On the other hand, when the protective substrate just serves as a protective layer, it doesn't matter whether the protective substrate is transparent or not. The same materials as those for the substrate are usable. For example, plastics such as polyester, acrylic resin, polyamide, polycarbonate resin, polyolefin resin, phenolic resin, epoxy resin, and polyimide; glass; ceramics; and metals can be used as the materials for the protective substrate.

(7) Adhesive Layer

The adhesive layer serves to attach the protective substrate to, for example, the protective layer. Any adhesive that can laminate the two recording media is usable. In view of the productivity, an ultraviolet-curing adhesive or a hot-melt adhesive are preferably employed for the purpose of the present invention.

The following examples will further illustrate the present invention.

EXAMPLE 1

A polycarbonate substrate was prepared by injection molding. The substrate had a thickness of 0.6 mm, a diameter of 120 mm and guide grooves having a depth of 1750 Å, a half width of 0.25 $\mu$m, a track pitch of 0.74 $\mu$m, a wobble period length of 32 T and a wobble amplitude of 10 nm. A coating liquid in which Compound I of the formula shown below was dissolved in 2,2,3,3-tetrafluoropropanol was coated with a spinner on the substrate to form an organic dye layer having a thickness of 1000 Å.

Compound I

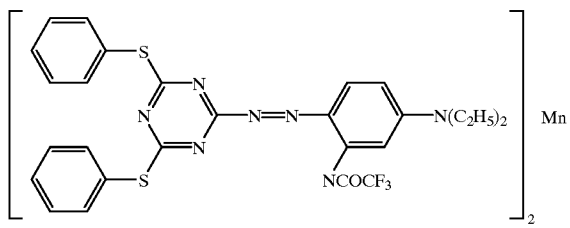

Compound III

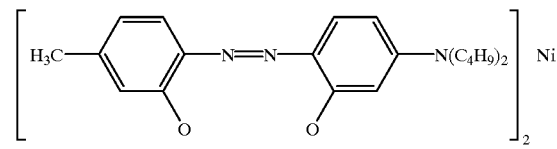

Then, a light reflective gold layer having a thickness of 1200 Å was formed on the dye layer by a sputtering method, on which a protective layer of an acrylic photo-polymer having a thickness of 5 μm was further formed, thereby obtaining a recording medium.

Figure 4A:
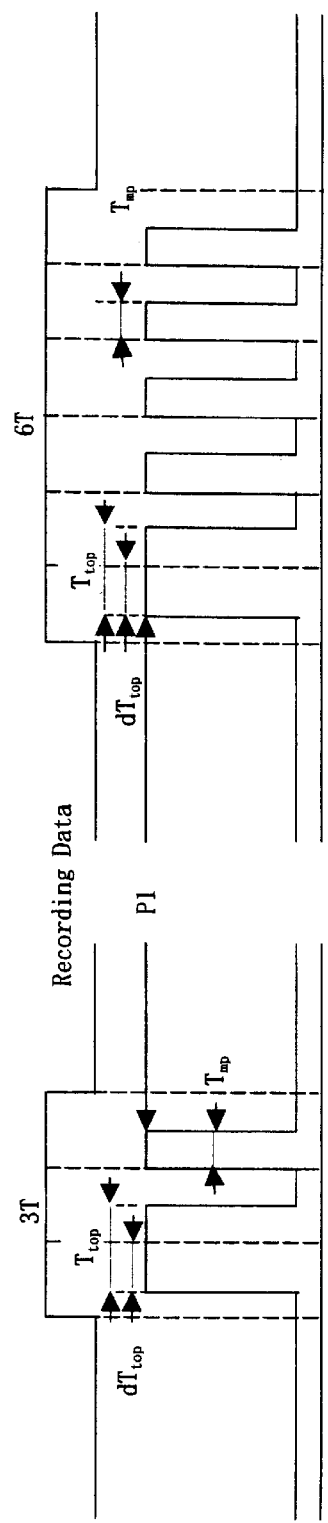
FIGS. 4(a) and 4(b) are schematic illustrations of emission waveforms of multipulse recording.
Figure 4B:
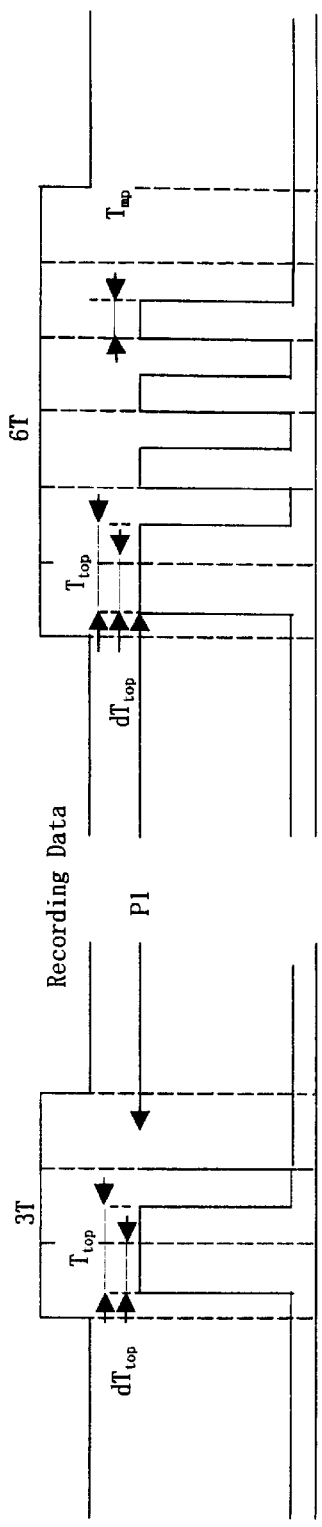

The thus obtained recording medium was recorded by multi-pulse recording as shown in FIG. 4(a) using a semiconductor laser beam having a wavelength of 658 nm and a beam diameter of 1.0 μm. The recording was performed at various recording linear velocity of 3.5, 5.0, 7.0 and 8.5 m/sec and at a fixed recording pulse length while changing the recording power. The recording pulse length used was the optimum pulse length standardized by the recording frequency when recorded at a linear recording velocity of 8.5 m/sec. The record at each recording linear velocity was reproduced with a continuous semiconductor laser beam of 658 nm (reproducing power: 0.7 mW) to observe the reproduced wave form. An optical disc evaluation device (DDU-1000 manufactured by Pulstech Industry Co., Ltd.) was used for measurement of recording sensitivity, jitter and PI error. The results are shown in Table 6.

EXAMPLE 2

Example 1 was repeated in the same manner as described except that the wobble amplitude was changed to 40 nm. The results are shown in Table 6.

EXAMPLE 3

Example 1 was repeated in the same manner as described except that Compound I was substituted by a mixture (50:50 weight ratio) of Compounds II and III of the formulas shown below. The results are shown in Table 6.

Compound II

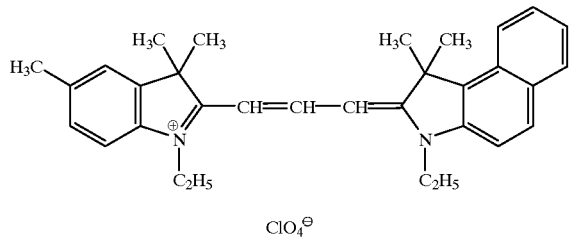

EXAMPLE 4

Example 1 was repeated in the same manner as described except that Compound I was substituted by Compounds IV of the formula shown below, that a mixed solvent of ethycyclohexane and 2-methoxyethanol was used in place of 2,2,3,3-tetrafluoropropanol, and that wobble period length was changed to 16T. The results are shown in Table 6.

Compound IV

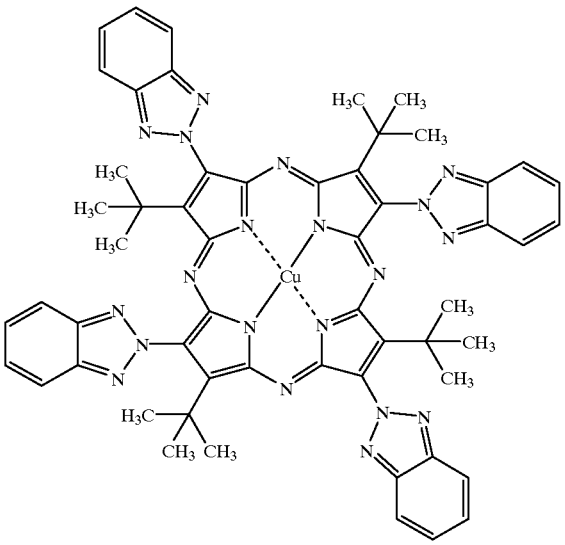

EXAMPLE 5

Example 1 was repeated in the same manner as described except that recording pulse length was varied with the recording linear velocity adopted. The recording power was also changed, accordingly. The results are shown in Table 6.

Comparative Example 1

Example 1 was repeated in the same manner as described except that the substrate used had a wobble period length of 190T and a wobble amplitude of 5 nm and was provided with land prepits. The results are shown in Table 6.

Comparative Example 2

Example 1 was repeated in the same manner as described except that the substrate used had a wobble period length 190T and a wobble amplitude of 40 nm and was provided with land prepits. The results are shown in Table 6.

TABLE 6

| Example No. | Wobble Amplitude (nm) | Linear Velocity (m/s) | Recording Sensitivity (mW) | Jitter (%) | PI Error (average) |
|---|---|---|---|---|---|
| Example 1 | 10 | 3.5 | 8.3 | 7.8 | 50 |
| | 10 | 5.0 | 9.8 | 7.6 | 30 |
| | 10 | 7.0 | 12.1 | 6.9 | 20 |
| | 10 | 8.5 | 13.7 | 7.1 | 15 |
| Example 2 | 40 | 3.5 | 8.4 | 7.8 | 65 |
| | 40 | 5.0 | 9.8 | 7.7 | 45 |
| | 40 | 7.0 | 12.5 | 7.4 | 10 |
| | 40 | 8.5 | 14.1 | 7.0 | 20 |
| Example 3 | 10 | 3.5 | 8.1 | 7.8 | 45 |
| | 10 | 5.0 | 9.7 | 7.5 | 30 |
| | 10 | 7.0 | 12.4 | 6.9 | 15 |
| | 10 | 8.5 | 14.3 | 7.2 | 20 |
| Example 4 | 40 | 3.5 | 8.7 | 7.7 | 60 |
| | 40 | 5.0 | 10.1 | 7.6 | 40 |
| | 40 | 7.0 | 12.8 | 7.5 | 30 |
| | 40 | 8.5 | 14.5 | 7.3 | 20 |
| Example 5 | 10 | 3.5 | 8.3 | 7.0 | 5 |
| | 10 | 5.0 | 9.7 | 7.2 | 10 |
| | 10 | 7.0 | 12.0 | 6.9 | 8 |
| | 10 | 8.5 | 13.5 | 7.1 | 15 |
| Comparative Example 1 | 5 | 3.5 | 8.3 | 7.8 | 180 |
| | 5 | 5.0 | 9.8 | 7.3 | 150 |
| | 5 | 7.0 | 11.9 | 7.0 | 90 |
| | 5 | 8.5 | 13.5 | 6.9 | 110 |
| Comparative Example 2 | 40 | 3.5 | 8.2 | 8.2 | 260 |
| | 40 | 5.0 | 9.7 | 8.0 | 220 |
| | 40 | 7.0 | 11.7 | 7.5 | 160 |
| | 40 | 8.5 | 13.4 | 7.2 | 130 |

EXAMPLE 6

A polycarbonate substrate was prepared by injection molding. The substrate had a thickness of 0.6 mm, a diameter of 120 mm, guide grooves having a depth of 1750 Å, a half width of 0.25 μm, a track pitch of 0.74 μm, a wobble period length of 32 T and a wobble amplitude of 300 Å. A coating liquid in which Compound A-1 (Table 1) and Compound C-1 (Table 3) were dissolved in 2,2,3,3-tetrafluoro-1-propanol with a weight ratio A-1/C-1 of 1:1 was coated with a spinner on the substrate to form an organic dye layer having a thickness of 900 Å. Then, a light reflective gold layer having a thickness of 1100 Å was formed on the dye layer by a sputtering method, on which a protective layer of an acrylic photo-polymer having a thickness of 7 μm was further formed, thereby obtaining a recording medium.

EXAMPLE 7

Example 6 was repeated in the same manner as described except that a combination of Compound B-1 (Table 2) and Compound D-1 (Table 4) with a weight ratio B-1/D-1 of 6:4 was substituted for the combination of A-1 and C-1.

EXAMPLE 8

Example 6 was repeated in the same manner as described except that a combination of Compound A-2 (Table 1) and Compound E-1 (Table 5) with a weight ratio A-2/E-1 of 4:6 was substituted for the combination of A-1 and C-1.
Comparative Example 3

Example 6 was repeated in the same manner as described except that the substrate used had a wobble period length of 190T and a wobble amplitude of 50 Å and was provided with land prepits.

Each of the recording media obtained in Examples 6–8 and Comparative Example 3 was subjected to light resistance test and was also tested for wavelength dependency of optimum recording power. The recording medium of Comparative Example 3 was further tested for LPP block error rate. Test methods are as follows.

Light Resistance Test:

Using a semiconductor laser beam having a wavelength of 635 nm and a beam diameter of 0.9 μm, an EFM signal is recorded on a disk at a recording linear velocity of 3.5 m/sec under such a strategy and at such a recording power that the bottom jitter is minimized. The record is then reproduced with a continuous laser beam of 649 nm (reproducing power: 0.3 mW) at such an equalizer gain as to provide a bottom jitter of 8.0%. PI error numbers are counted. The above procedures are repeated in the same manner as described above except that the recording is performed with a semiconductor laser beam having a wavelength of 657 nm and a beam diameter of 0.85 μm. The above PI error measurement is carried out before and after 50 hour exposure of the recorded disk to 50000 lux light.

Wavelength Dependency Test:

The optimum recording power Pa in the recording with 635 nm laser beam and the optimum recording power Pb in the recording with 657 nm laser beam are determined. The wavelength dependency is calculated in terms of Pb/Pa. The larger the Pb/Pa ratio, the greater is the wavelength dependency.

LLP Block Error Rate:

Using bands providing LPPb of about 0.12, about 0.20 and about 0.36, LPP block error rates are measured with a recording pickup.

Test results are summarized in Table 7.

TABLE 7

| Example No. | PI error number (before exposure) 635 nm record | PI error number (before exposure) 657 nm record | PI error number (after exposure) 635 nm record | PI error number (after exposure) 657 nm record | Pb/Pa | LPPb | LPPb block error rate |
|---|---|---|---|---|---|---|---|
| 6 | 5 | 15 | 10 | 18 | 1.05 | — | — |
| 7 | 10 | 8 | 20 | 12 | 1.08 | — | — |
| 8 | 3 | 10 | 5 | 10 | 1.10 | — | — |
| Comp. Example 3 | 30 | 30 | 35 | 35 | 1.05 | ca. 0.12 | 38.0% |
| | 35 | 40 | 42 | 42 | 1.05 | ca. 0.20 | 0.5% |
| | 830 | 1010 | 880 | 1020 | 1.05 | ca. 0.36 | 0.0% |

EXAMPLE 9

A polycarbonate substrate was prepared by injection molding. The substrate had a thickness of 0.6 mm, a diameter of 120 mm, guide grooves having a depth of 1750 Å, a half width of 0.25 μm and a track pitch of 0.74 μm, a wobble period length of 32 T and a wobble amplitude of 10 nm. A coating liquid in which Compound V of the formula shown below was dissolved in 2,2,3,3-tetrafluoropropanol was coated with a spinner on the substrate to form an organic dye layer having a thickness of 900 Å.

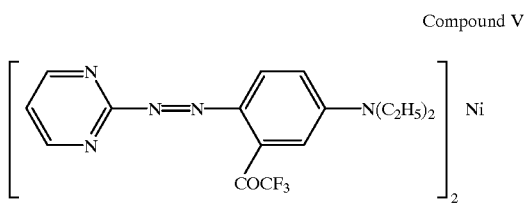

Compound V

Then, a light reflective gold layer having a thickness of 1100 Å was formed on the dye layer by a sputtering method, on which a protective layer of an acrylic photo-polymer having a thickness of 7 μm was further formed, thereby obtaining a recording medium. The above procedures were repeated in the same manner as described except that substrates having wobble amplitudes of 25 nm and 40 nm were used.

EXAMPLE 10

Example 9 was repeated in the same manner as described except that Compound V was substituted by a mixture (50:50 weight ratio) of Compounds II and III of the formulas shown above.

EXAMPLE 11

Example 9 was repeated in the same manner as described except that Compound V was substituted by Compounds IV of the formula shown above, and that a mixed solvent of ethycyclohexane and 2-methoxyethanol was used in place of 2,2,3,3-tetrafluoropropanol.
Comparative Example 4

Example 9 was repeated in the same manner as described except that the substrate used had a wobble period length of 190T and a wobble amplitude of 5 nm and was provided with land prepits.

EXAMPLE 12

A polycarbonate substrate was prepared by injection molding. The substrate had a thickness of 0.6 mm, a diameter of 120 mm and guide grooves having a depth of 1800 Å, a half width of 0.23 μm, a track pitch of 0.74 μm, a wobble period length of 16 T and a wobble amplitude of 10 nm. A coating liquid in which Compound VI of the formula shown below was dissolved in 2,2,3,3-tetrafluoropropanol was coated with a spinner on the substrate to form an organic dye layer having a thickness of 900 Å.

Compound VI

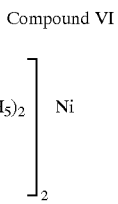

Then, a light reflective gold layer having a thickness of 1100 Å was formed on the dye layer by a sputtering method, on which a protective layer of an acrylic photo-polymer having a thickness of 7 μm was further formed. Thereafter, a polycarbonate plate having a thickness of 0.6 mm was bonded on the protective layer with an acrylic photo-polymer, thereby obtaining a recording medium. The above procedures were repeated in the same manner as described except that substrates having wobble amplitudes of 25 nm and 40 nm were used.

EXAMPLE 13

Example 12 was repeated in the same manner as described except that Compound VI was substituted by a mixture (50:50 weight ratio) of Compounds VII and VIII of the formulas shown below.

Compound VII

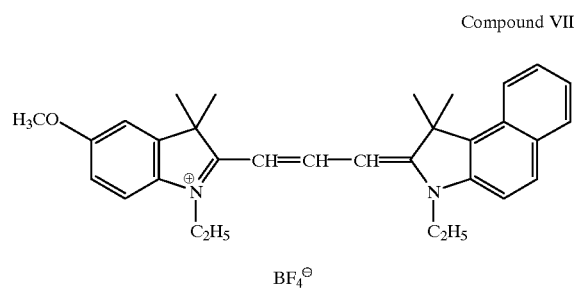

Compound VIII

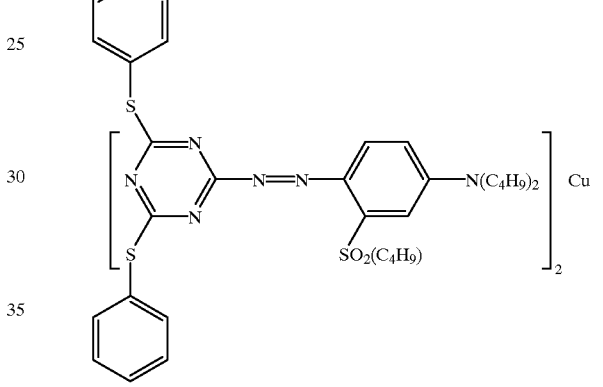

EXAMPLE 14

Example 12 was repeated in the same manner as described except that Compound VI was substituted by Compounds IV of the formula shown above, and that a mixed solvent of ethycyclohexane and 2-methoxyethanol was used in place of 2,2,3,3-tetrafluoropropanol.
Comparative Example 5

Example 12 was repeated in the same manner as described except that the substrate used had a wobble period length of 190T and a wobble amplitude of 5 nm and was provided with land prepits.

Each of the recording media obtained in Examples 9–14 and Comparative Examples 4 and 5 was measured for PI error. The recording media of Comparative Examples 4 and 5 were further tested for LPP block error rate according to the above-described method. PI error was measured as follows.
PI error:

Using a semiconductor laser beam having a wavelength of 635 nm (for optical disks of Examples 9–11 and Comparative Example 4) or 657 nm (for optical disks of Examples 12–14 and and Comparative Example 5) and a beam diameter of 0.9 μm, an EFM signal is recorded on a disk at a recording linear velocity of 3.5 m/sec under such a strategy and at such a recording power that the bottom jitter is minimized. The record is then reproduced with a continuous laser beam of 649 nm (reproducing power: 0.3 mW) at such an equalizer gain as to provide a bottom jitter of 8.0%. PI error numbers are counted.

Test results are summarized in Table 8.

TABLE 8

| Example No. | Wobble Amplitude (nm) | LPPb | LPP block error rate (%) | PT error number (average) |
|---|---|---|---|---|
| Example 9 | 10 | — | — | 10 |
|  | 25 | — | — | 10 |
|  | 40 | — | — | 25 |
| Example 10 | 10 | — | — | 15 |
|  | 25 | — | — | 18 |
|  | 40 | — | — | 24 |
| Example 11 | 10 | — | — | 25 |
|  | 25 | — | — | 30 |
|  | 40 | — | — | 35 |
| Comparative Example 4 | 5 | Ca. 0.12 | 35.8 | 15 |
|  | 5 | Ca. 0.22 | 0.8 | 30 |
|  | 5 | Ca. 0.36 | 0.1 | 395 |
| Example 12 | 10 | — | — | 25 |
|  | 25 | — | — | 28 |
|  | 40 | — | — | 37 |
| Example 13 | 10 | — | — | 30 |
|  | 25 | — | — | 25 |
|  | 40 | — | — | 35 |
| Example 14 | 10 | — | — | 45 |
|  | 25 | — | — | 40 |
|  | 40 | — | — | 55 |
| Comparative Example 5 | 5 | Ca. 0.12 | 45.6 | 40 |
|  | 5 | ca. 0.22 | 11 | 60 |
|  | 5 | ca. 0.36 | 0.2 | 550 |

EXAMPLE 15

A polycarbonate substrate was prepared by injection molding. The substrate had a thickness of 0.6 mm, a diameter of 120 mm and guide grooves having a depth (d1) of 1750 Å, a half width (W1) of 0.25 μm, a track pitch (Tr) of 0.74 μm, a wobble period length (PL) of 32 T and a wobble amplitude (W2) of 25 nm. A coating liquid in which Compound V of the formula shown above was dissolved in 2,2,3,3-tetrafluoropropanol was coated with a spinner on the substrate to form an organic dye layer having a thickness of 900 Å. Then, a light reflective gold layer having a thickness of 1100 Å was formed on the dye layer by a sputtering method, on which a protective layer of an acrylic photo-polymer having a thickness of 7 μm was further formed, thereby obtaining a recording medium. The recording medium was found to have a land-groove distance (d2) of 900 Å.

EXAMPLE 16

A polycarbonate substrate was prepared by injection molding. The substrate had a thickness of 0.6 mm, a diameter of 120 mm and guide grooves having a depth (d1) of 1950 Å, a half width (W1) of 0.28 μm, a track pitch (Tr) of 0.70 μm, a wobble period length (PL) of 64 T and a wobble amplitude (W2) of 60 nm. A coating liquid in which a mixture (50:50 weight ratio) of Compounds II and III of the formulas shown above was dissolved in 2,2,3,3-tetrafluoro-1-propanol was coated with a spinner on the substrate to form an organic dye layer having a thickness of 1050 Å. Then, a light reflective silver layer having a thickness of 1000 Å was formed on the dye layer by a sputtering method, on which a protective layer of an acrylic photo-polymer having a thickness of 10 μm was further formed, thereby obtaining a recording medium. The recording medium was found to have a land-groove distance (d2) of 950 Å.

EXAMPLE 17

A polycarbonate substrate was prepared by injection molding. The substrate had a thickness of 0.6 mm, a diameter of 120 mm and guide grooves having a depth (d1) of 1550 Å, a half width (W1) of 0.20 μm, a track pitch (Tr) of 0.74 μm, a wobble period length (PL) of 16 T and a wobble amplitude (W2) of 40 nm. A coating liquid in which Compound IV of the formula shown above was dissolved in methylcyclohexane was coated with a spinner on the substrate to form an organic dye layer having a thickness of 1100 Å. Then, a light reflective gold layer having a thickness of 1000 Å was formed on the dye layer by a sputtering method, on which a protective layer of an acrylic photo-polymer having a thickness of 10 μm was further formed, thereby obtaining a recording medium. The recording medium was found to have a land-groove distance (d2) of 860 Å.

Comparative Example 6

Example 15 was repeated in the same manner as described except that the substrate used had a wobble period length of 180T and a wobble amplitude of 5 nm and was provided with land prepits.

EXAMPLE 18

A polycarbonate substrate was prepared by injection molding. The substrate had a thickness of 0.6 mm, a diameter of 120 mm and guide grooves having a depth (d1) of 1800 Å, a half width (W1) of 0.22 μm, a track pitch (Tr) of 0.72 μm, a wobble period length (PL) of 32 T and a wobble amplitude (W2) of 30 nm. A coating liquid in which Compound VI of the formula shown above was dissolved in 2,2,3,3-tetrafluoro-1-propanol was coated with a spinner on the substrate to form an organic dye layer having a thickness of 1000 Å. Then, a light reflective silver layer having a thickness of 1000 Å was formed on the dye layer by a sputtering method, on which a protective layer of an acrylic photo-polymer having a thickness of 10 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 950 Å.

EXAMPLE 19

A polycarbonate substrate was prepared by injection molding. The substrate had a thickness of 0.6 mm, a diameter of 120 mm and guide grooves having a depth (d1) of 1850 Å, a half width (W1) of 0.32 μm, a track pitch (Tr) of 0.74 μm, a wobble period length (PL) of 16 T and a wobble amplitude (W2) of 20 nm. A coating liquid in which a mixture (50:50 weight ratio) of Compounds VII and VIII of the formulas shown above was dissolved in 2,2,3,3-tetrafluoro-1-propanol was coated with a spinner on the substrate to form an organic dye layer having a thickness of 1050 Å. Then, a light reflective silver layer having a thickness of 1000 Å was formed on the dye layer by a sputtering method, on which a protective layer of an acrylic photo-polymer having a thickness of 10 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 890 Å.

EXAMPLE 20

A polycarbonate substrate was prepared by injection molding. The substrate had a thickness of 0.6 mm, a diameter of 120 mm and guide grooves having a depth (d1) of 1700 Å, a half width (W1) of 0.17 μm, a track pitch (Tr) of 0.74 μm, a wobble period length (PL) of 96 T and a wobble amplitude (W2) of 50 nm. A coating liquid in which a Compound IV of the formula shown above was dissolved in methylcyclohexane was coated with a spinner on the substrate to form an organic dye layer having a thickness of 1100 Å. Then, a light reflective gold layer having a thickness of 1000 Å was formed on the dye layer by a sputtering method, on which a protective layer of an acrylic photo-polymer having a thickness of 10 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 890 Å.

Comparative Example 7

Example 19 was repeated in the same manner as described except that the substrate used had a wobble period length of 190T and a wobble amplitude of 5 nm and was provided with land prepits.

The values of (d1)×(PL), (d2)×(PL), (W1)×(PL), (W2)/(PL) and (Tr)×(PL) of each of the recording media obtained in Examples 15–20 and Comparative Examples 6 and 7 are summarized in Table 9 below. Preferred ranges of these values are also indicated in Table 9.

TABLE 9

| Example No. | (4000≦) d1 × PL (≦240000) | (1200≦) d2 × PL (≦160000) | (0.7≦) W1 × PL (≦40) | (2≦) W2/PL (≦500) | (2≦) Tr × PL (≦80) |
|---|---|---|---|---|---|
| 15 | 56000 | 28800 | 8 | 7.8 | 23.68 |
| 16 | 124800 | 60800 | 17.92 | 9.4 | 44.80 |
| 17 | 24800 | 13760 | 3.2 | 25 | 11.84 |
| Comp. 6 | 31500 | 16200 | 45 | 0.28 | 133.2 |
| 18 | 57600 | 30400 | 7.04 | 9.4 | 23.04 |
| 19 | 29600 | 14240 | 5.12 | 12.5 | 11.84 |
| 20 | 163200 | 85440 | 16.32 | 5.2 | 71.04 |
| Comp. 7 | 351500 | 169100 | 60.8 | 0.26 | 140.6 |

Each of the recording media obtained in Examples 15–20 and Comparative Examples 6 and 7 was measured for PI error according to the method described previously in Examples 9–14. The recording media of Comparative Examples 6 and 7 were further tested for LPP block error rate according to the above-described method. Test results are summarized in Table 10.

TABLE 10

| Example No. | LPPb | LPP block error rate (%) | PI error number (average) |
|---|---|---|---|
| Example 15 | — | — | 10 |
| Example 16 | — | — | 18 |
| Example 17 | — | — | 25 |
| Comparative Example 6 | ca. 0.12 | 35.8 | 15 |
|  | ca. 0.22 | 0.8 | 30 |
|  | ca. 0.36 | 0.1 | 395 |
| Example 18 | — | — | 15 |
| Example 19 | — | — | 20 |
| Example 20 | — | — | 25 |
| Comparative Example 7 | ca. 0.12 | 45.6 | 40 |
| Example 7 | ca. 0.22 | 11 | 60 |
|  | ca. 0.36 | 0.2 | 550 |

EXAMPLE 21

Figure 5:
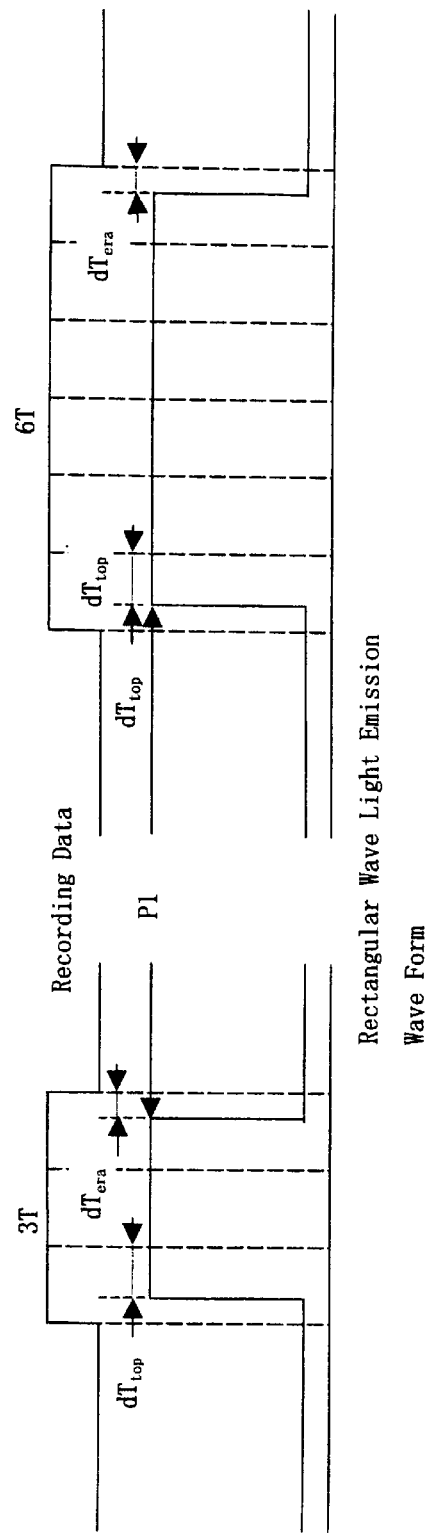
FIG. 5 is schematic illustration of emission waveform of rectangular wave recording.
Figure 6:
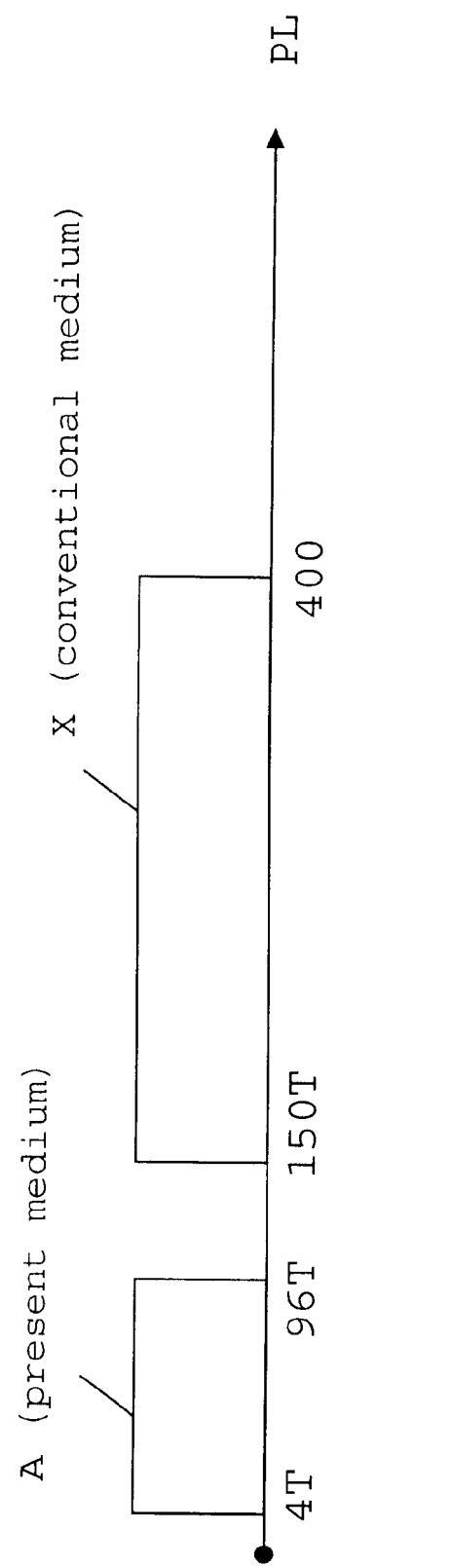
FIG. 6 is a comparison between the present invention medium and conventional medium.

Each of the recording media obtained in Examples 1–4 and Comparative Examples 1 and 2 was recorded by rectangular wave recording as shown in FIG. 5 using a semiconductor laser beam having a wavelength of 658 nm and a beam diameter of 1.0 μm. The recording was performed at various recording linear velocity of 3.5, 5.0, 7.0 and 8.5 m/sec and at a fixed recording pulse length while changing the recording power. The recording pulse length used was the optimum pulse length standardized by the recording frequency when recorded at respective linear recording velocites. The record at each recording linear velocity was reproduced with a continuous semiconductor laser beam of 658 nm (reproducing power: 0.7 mW) to observe the reproduced wave form. An optical disc evaluation device (DDU-1000 manufactured by Pulstech Industry Co., Ltd.) was used for measurement of recording sensitivity, jitter and PI error. The results are shown in Table 11.

TABLE 11

| Recording Medium | Wobble Amplitude (nm) | Linear Velocity (m/s) | Recording Sensitivity (mW) | Jitter (%) | PI Error (average) |
|---|---|---|---|---|---|
| Example 1 | 10 | 3.5 | 7.8 | 7.0 | 5 |
|  | 10 | 5.0 | 9.3 | 6.8 | 15 |
|  | 10 | 7.0 | 11.5 | 6.5 | 15 |
|  | 10 | 8.5 | 12.9 | 6.9 | 15 |
| Example 2 | 40 | 3.5 | 7.8 | 7.2 | 10 |
|  | 40 | 5.0 | 9.4 | 7.2 | 20 |
|  | 40 | 7.0 | 11.4 | 7.0 | 15 |
|  | 40 | 8.5 | 12.8 | 6.9 | 25 |
| Example 3 | 10 | 3.5 | 7.6 | 6.9 | 10 |
|  | 10 | 5.0 | 9.0 | 6.8 | 15 |
|  | 10 | 7.0 | 11.2 | 6.7 | 20 |
|  | 10 | 8.5 | 12.7 | 7.0 | 15 |
| Example 4 | 40 | 3.5 | 8.1 | 7.3 | 20 |
|  | 40 | 5.0 | 9.7 | 7.1 | 25 |
|  | 40 | 7.0 | 12.0 | 7.0 | 30 |
|  | 40 | 8.5 | 13.3 | 7.1 | 15 |
| Comparative Example 1 | 5 | 3.5 | 7.8 | 6.7 | 100 |
|  | 5 | 5.0 | 9.4 | 6.8 | 80 |
|  | 5 | 7.0 | 11.4 | 6.4 | 100 |
|  | 5 | 8.5 | 13.0 | 6.7 | 120 |

EXAMPLE 22

A polycarbonate substrate having a thickness of 0.6 mm, a diameter of 120 mm and a surface provided with guide grooves was prepared by injection molding using a stamper. The stamper had a surface providing, as a replica, the guide grooves of the substrate having a depth (d1) of 1750 Å, a half width (W1) of 0.25 μm, a track pitch (Tr) of 0.74 μm, a wobble period length (PL) of 32 T and a wobble amplitude (W2) continuously increasing from 250 Å (Wi at innermost groove) to 300 Å (Wt at outermost groove). A coating liquid in which Ni chelate Compound IX of the formula shown below was dissolved in 2,2,3,3-tetrafluoro-1-propanol was coated with a spinner on the substrate to form an organic dye layer having a thickness of 1200 Å. Then, a light reflective gold layer having a thickness of 1400 Å was formed on the dye layer by a sputtering method, on which a protective layer of an acrylic photo-polymer having a thickness of 7 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 1000 Å.

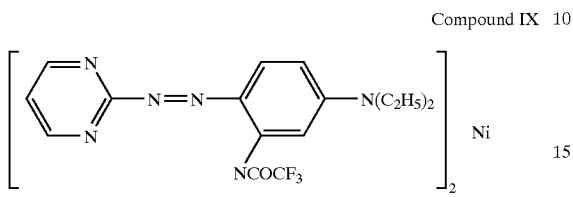

Compound IX

EXAMPLE 23

A polycarbonate substrate was prepared by injection molding using a stamper. The substrate had a thickness of 0.6 mm, a diameter of 120 mm, guide grooves having a depth (d1) of 1950 Å, a half width (W1) of 0.28 μm and a track pitch (Tr) of 0.70 μm, a wobble period length (PL) of 64 T and a wobble amplitude (W2) continuously increasing from 280 Å (Wi at innermost groove) to 300 Å (Wt at outermost groove). A coating liquid in which a mixture (50:50 weight ratio) of Compounds II and III of the formulas shown above was dissolved in 2,2,3,3-tetrafluoro-1-propanol was coated with a spinner on the substrate to form an organic dye layer having a thickness of 1050 Å. Then, a light reflective silver layer having a thickness of 1000 Å was formed on the dye layer by a sputtering method, on which a protective layer of an acrylic photo-polymer having a thickness of 10 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 950 Å.

EXAMPLE 24

A polycarbonate substrate was prepared by injection molding using a stamper. The substrate had a thickness of 0.6 mm, a diameter of 120 mm, guide grooves having a depth (d1) of 1550 Å, a half width (W1) of 0.20 μm and a track pitch (Tr) of 0.74 μm, a wobble period length (PL) of 16 T and a wobble amplitude (W2) continuously increasing from 400 Å (Wi at innermost groove) to 520 Å (Wt at outermost groove). A coating liquid in which a Compound IV of the formula shown above was dissolved in methylcyclohexane was coated with a spinner on the substrate to form an organic dye layer having a thickness of 1100 Å. Then, a light reflective gold layer having a thickness of 1000 Å was formed on the dye layer by a sputtering method, on which a protective layer of an acrylic photo-polymer having a thickness of 10 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 900 Å.

Comparative Example 8

Example 22 was repeated in the same manner as described except that the substrate used had a wobble period length of 180T and a wobble amplitude of 20 Å and was provided with land prepits.

EXAMPLE 25

A polycarbonate substrate was prepared by injection molding using a stamper. The substrate had a thickness of 0.6 mm, a diameter of 120 mm, guide grooves having a depth (d1) of 1800 Å, a half width (W1) of 0.22 um and a track pitch (Tr) of 0.72 μm, a wobble period length (PL) of 32 T and a wobble amplitude (W2) continuously increasing from 1000 Å (Wi at innermost groove) to 1200 Å (Wt at outermost groove). A coating liquid in which Compound VI of the formula shown above was dissolved in 2,2,3,3-tetrafluoro-1-propanol was coated with a spinner on the substrate to form an organic dye layer having a thickness of 1000 Å. Then, a light reflective silver layer having a thickness of 1000 Å was formed on the dye layer by a sputtering method, on which a protective layer of an acrylic photo-polymer having a thickness of 10 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 950 Å.

EXAMPLE 26

A polycarbonate substrate was prepared by injection molding using a stamper. The substrate had a thickness of 0.6 mm, a diameter of 120 mm, guide grooves having a depth (d1) of 1850 Å, a half width (W1) of 0.32 μm and a track pitch (Tr) of 0.74 μm, a wobble period length (PL) of 16 T and wobble amplitudes (W2) of 200 Å (Wi from innermost groove to an intermediate groove located at a radius of 40 mm)) and 220 Å (Wt from the intermediate groove to the outermost groove). A coating liquid in which a mixture (50:50 weight ratio) of Compounds VII and VIII of the formulas shown above was dissolved in 2,2,3,3-tetrafluoro-1-propanol was coated with a spinner on the substrate to form an organic dye layer having a thickness of 1050 Å. Then, a light reflective silver layer having a thickness of 1000 Å was formed on the dye layer by a sputtering method, on which a protective layer of an acrylic photo-polymer having a thickness of 10 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 890 Å.

EXAMPLE 27

A polycarbonate substrate was prepared by injection molding using a stamper. The substrate had a thickness of 0.6 mm, a diameter of 120 mm, guide grooves having a depth (d1) of 1700 Å, a half width (W1) of 0.17 μm and a track pitch (Tr) of 0.74 μm, a wobble period length (PL) of 96 T and a wobble amplitude (W2) continuously increasing from 500 Å (Wi at innermost groove) to 700 Å (Wt at outermost groove). A coating liquid in which a Compound IV of the formula shown above was dissolved in methylcyclohexane was coated with a spinner on the substrate to form an organic dye layer having a thickness of 1100 Å. Then, a light reflective gold layer having a thickness of 1000 Å was formed on the dye layer by a sputtering method, on which a protective layer of an acrylic photo-polymer having a thickness of 10 μm was further formed. Thereafter, a polycarbonate plate having a thickness of 0.6 mm was bonded on the protective layer with an acrylic photo-polymer, thereby obtaining a recording medium. The recording medium was found to have a land-groove distance (d2) of 890 Å.

Comparative Example 9

Example 26 was repeated in the same manner as described except that the substrate used had a wobble period length of 190T and a wobble amplitude of 30 Å and was provided with land prepits.

The values of (Wo/Wi), (d1)×(PL), (d2)×(PL), (W1)×(PL), (W2)/(PL) and (Tr)×(PL) of each of the recording media obtained in Examples 22–27 and Comparative Examples 8 and 9 are summarized in Table 12 below. Preferred ranges of these values are also indicated in Table 12.

TABLE 12

| Example No. | 4000≦ d1 × PL ≦240000 | 1200≦ d2 × PL ≦160000 | 0.7≦ W1 × PL ≦40 | 1.05≦ Wo/Wi ≦1.40 | 2≦ (Wi,Wo)/ PL ≦500 | 2≦ Tr × PL ≦80 |
|---|---|---|---|---|---|---|
| 22 | 56000 | 32000 | 8 | 1.20 | 7.8–9.4 | 23.7 |
| 23 | 124800 | 60800 | 17.9 | 1.12 | 4.4–4.7 | 44.8 |
| 24 | 24800 | 14000 | 3.2 | 1.30 | 28–32.5 | 11.8 |
| Comp. 8 | 31500 | 18000 | 45 | 1.0 | 0.11 | 133.2 |
| 25 | 57600 | 30400 | 7.0 | 1.20 | 31.5–37.5 | 23.0 |
| 26 | 29600 | 14240 | 5.1 | 1.10 | 12.5–13.8 | 11.8 |
| 27 | 163200 | 85440 | 16.3 | 1.40 | 5.2–7.8 | 71.0 |
| Comp. 9 | 351500 | 169100 | 60.8 | 1.0 | 0.15 | 140.6 |

Each of the recording media obtained in Examples 22–27 and Comparative Examples 8 and 9 was measured for PI error according to the method described previously in Examples 9–14. The recording media of Comparative Examples 8 and 9 were further tested for LPP block error rate according to the above-described method. Test results are summarized in Table 13. Additionally, each of the recording media obtained in Examples 22–24 was measured for wobble C/N under tracking at positions corresponding to the innermost and outermost grooves and the grooves of the radii of 30 mm, 40 mm and 50 mm using a semiconductor laser beam having an oscillation wavelength of 635 and a beam diameter of 0.90 μm. The results are shown in Table 14.

TABLE 13

| Example No. | LPPb | LPP block error rate (%) | PI error number (average) |
|---|---|---|---|
| Example 22 | — | — | 12 |
| Example 23 | — | — | 18 |
| Example 24 | — | — | 25 |
| Comparative Example 8 | ca. 0.12 | 35.8 | 15 |
| | ca. 0.22 | 0.8 | 30 |
| | ca. 0.36 | 0.1 | 395 |
| Example 25 | — | — | 15 |
| Example 26 | — | — | 20 |
| Example 27 | — | — | 25 |
| Comparative Example 9 | ca. 0.12 | 45.6 | 40 |
| | ca. 0.22 | 11 | 60 |
| | ca. 0.36 | 0.2 | 550 |

TABLE 14

| | Wobble C/N (DB) | | | | |
|---|---|---|---|---|---|
| Example No. | Innermost | Radius 30 mm | Radius 40 mm | Radius 50 mm | Outermost |
| 22 | 49.9 | 50.0 | 50.2 | 50.1 | 49.8 |
| 23 | 50.1 | 50.8 | 50.5 | 50.2 | 50.4 |
| 24 | 52.1 | 51.9 | 52.0 | 51.8 | 51.9 |

The substrates of Examples 22–27 were produced with a tact time of less than 10 seconds. Yet, the recording media obtained had uniformity throughout the radius as appreciated from the results shown in Table 4.

EXAMPLE 28

A polycarbonate substrate having a thickness of 0.6 mm, a diameter of 120 mm and a surface provided with guide grooves was prepared by injection molding using a stamper at a cycle time of 5 seconds. The stamper had a surface providing, as a replica, the guide grooves of the substrate having a depth linearly increasing from 1680 Å (Di at the innermost groove) to 1850 Å (Do at the outermost groove), a half width (W1) of 0.22 μm and a track pitch (Tr) of 0.74 μm, a wobble period length (PL) of 32 T and a wobble amplitude (W2) of 35 nm. A coating liquid in which Ni chelate Compound IX of the formula shown above was dissolved in 2,2,3,3-tetrafluoro-1-propanol was coated with a spinner on the substrate to form an organic dye layer having a thickness of 900 Å. Then, a light reflective gold layer having a thickness of 1100 Å was formed on the dye layer by a sputtering method, on which a protective layer of an acrylic photo-polymer having a thickness of 7 μm was further formed. Thereafter, a polycarbonate plate having a thickness of 0.6 mm was bonded on the protective layer with an acrylic photo-polymer, thereby obtaining a recording medium.

EXAMPLE 29

Example 28 was repeated in the same manner as described except that the Compound IX was substituted by a mixture of Compounds II and III having a mixing weight ratio of 1:1.

EXAMPLE 30

A polycarbonate substrate having a thickness of 0.6 mm and a diameter of 120 mm was prepared by injection molding using a stamper at a cycle time of 6 seconds. The stamper was adapted to provide guide grooves on the substrate having such a depth (d1) that is maintained at 1700 Å (d1) in the region from the innermost groove to an intermediate groove located at a radius of 35 mm but linearly increases from 1700 to 1880 Å (Do) in the region from the intermediate groove to the outermost groove, such a half width (W1) that is maintained at 0.24 μm in the region from the innermost groove to the intermediate groove but increases from 0.24 μm to 0.26 μm in the region from the intermediate groove to the outermost groove, a track pitch (Tr) of 0.74 μm, a wobble period length (PL) of 16 T and a wobble amplitude (W2) of 30 nm. A coating liquid in which a Compound IV of the formula shown above was dissolved in a mixed solvent of ethylcyclohexane and 2-methoxyethanol was coated with a spinner on the substrate to form an organic dye layer having a thickness of 1000 Å. Then, a light reflective gold layer having a thickness of 1100

Å was formed on the dye layer by a sputtering method, on which a protective layer of an acrylic photo-polymer having a thickness of 7 μm was further formed. Thereafter, a polycarbonate plate having a thickness of 0.6 mm was bonded on the protective layer with an acrylic photo-polymer, thereby obtaining a recording medium.

EXAMPLE 31

A polycarbonate substrate having a thickness of 0.6 mm and a diameter of 120 mm was prepared by injection molding using a stamper at a cycle time of 5 seconds. The stamper was adapted to provide guide grooves on the substrate having a depth linearly increasing from 1680 Å (Di at the innermost groove) to 1850 Å (Do at the outermost groove), a half width (W1) of 0.21 μm and a track pitch (Tr) of 0.74 μm, a wobble period length (PL) of 16 T and a wobble amplitude (W2) of 40 nm. A coating liquid in which Compound VI of the formula shown above was dissolved in 2,2,3,3-tetrafluoro-1-propanol was coated with a spinner on the substrate to form an organic dye layer having a thickness of 900 Å. Then, a light reflective gold layer having a thickness of 1100 Å was formed on the dye layer by a sputtering method, on which a protective layer of an acrylic photo-polymer having a thickness of 7 μm was further formed. Thereafter, a polycarbonate plate having a thickness of 0.6 mm was bonded on the protective layer with an acrylic photo-polymer, thereby obtaining a recording medium.

EXAMPLE 32

Example 31 was repeated in the same manner as described except that the Compound VI was substituted by a mixture of Compounds VII and VIII shown above having a mixing weight ratio of 40:60 to obtain a recording medium.

EXAMPLE 33

Example 31 was repeated in the same manner as described except that the Compound VI was substituted by a Compound IV shown above and that a mixed solvent of ethylcyclohexane and 2-methoxyethanol was used in place of 2,2,3,3-tetrafluoro-1-propanol, thereby to obtain a recording medium.

Comparative Example 10

Example 32 was repeated in the same manner as described except that the substrate used had a constant groove depth of 1680 Å, a half width of 0.21 μm, a track pitch of 0.74 μm, a wobble period length of 190T and a wobble amplitude of 50 nm and was provided with land prepits.

Each of the recording media obtained in Examples 31–33 and Comparative Example 10 was measured for PI error according to the method described previously in Examples 9–14. The recording media of Comparative Example 10 was further tested for LPP block error rate according to the above-described method. Test results are summarized in Table 15. Additionally, each of the recording media obtained in Examples 28–30 was measured for push-pull output at positions corresponding to the innermost and outermost grooves and the grooves of the radii of 30 mm, 40 mm and 50 mm using a semiconductor laser beam having an oscillation wavelength of 635 and a beam diameter of 0.90 um and passed through a filter of 30 KHz. The results are shown in Table 16.

TABLE 15

| Example No. | Position measured (radius: mm) | LPPb | LPP block error rate (%) | PT error number (average) |
|---|---|---|---|---|
| Example 31 | 23.0 | — | — | 25 |
|  | 42.0 | — | — | 28 |
|  | 57.9 | — | — | 37 |
| Example 32 | 23.0 | — | — | 30 |
|  | 42.0 | — | — | 25 |
|  | 57.9 | — | — | 30 |
| Example 33 | 23.0 | — | — | 45 |
|  | 42.0 | — | — | 40 |
|  | 57.9 | — | — | 35 |
| Comparative Example 10 | — | ca. 0.12 | 45.6 | 40 |
|  | — | ca. 0.22 | 1.1 | 60 |
|  | — | ca. 0.36 | 0.2 | 550 |

TABLE 16

| | Push-Pull Output (mV) | | | | |
|---|---|---|---|---|---|
| Example No. | Innermost | Radius 30 mm | Radius 40 mm | Radius 50 mm | Outermost |
| 28 | 420 | 415 | 425 | 425 | 430 |
| 29 | 440 | 430 | 445 | 440 | 435 |
| 30 | 480 | 465 | 480 | 485 | 490 |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Applications No. 2000-243157, filed Aug. 10, 2000,
No. 2000-270833, filed Sep. 6, 2000;
No. 2000-306808, filed Oct. 5, 2000;
No. 2000-306809, filed Oct. 5, 2000;
No. 2000-306810, filed Oct. 5, 2000;
No. 2001-17483, filed Jan. 25, 2001;
No. 2001-28845, filed Feb. 5, 2001;
No. 2001-84738, filed Mar. 23, 2001;
No. 2001-97847, filed Mar. 30, 2001;
No. 2001-99870, filed Mar. 30, 2001;
inclusive of the specifications, claims and drawings, are hereby incorporated by reference herein.

What is claimed is:

1. An optical recording medium comprising a disk-like substrate and a recording layer provided over said substrate and containing at least one organic dye, said substrate having a wobble with a period length PL in the range of 4T to 96T, a track pitch of 0.64–0.8 μm and a groove width of 0.18–0.40 μm in terms of half value width.

2. An optical recording medium as claimed in claim 1, wherein said substrate has a wobble amplitude of Wo, and wherein the ratio WO/PP is in the range of 0.1 to 0.4 where PP represents a push-pull amplitude.

3. An optical recording medium as claimed in claim 1, wherein said recording layer contains at least two organic dyes one of which, when formed by itself into a film, has a maximum absorption wavelength greater than those of the other dyes and a refractive index greater than those of other dyes.

4. An optical recording medium as claimed in claim 1, and being, when recorded, reproduceable with a reproducing wavelength, wherein said recording layer, when formed by itself into a film, has a refractive index in the range of 1.5 to 3.0 and an extinction coefficient in the range of 0.02 to 0.2 both at a wavelength between ±5 nm from the reproducing wavelength.

5. An optical recording medium as claimed in claim 4, wherein said substrate has a groove depth d1 (Å) satisfying the following relationship:

$$4000 \leq (d1) \times (PL) \leq 240000$$

where PL is as defined above.

6. An optical recording medium as claimed in claim 1, wherein said organic dye is at least one dye selected from the group consisting of metal chelate dyes, polymethine dyes, squalelium dyes and azaannulene dyes.

7. An optical recording medium as claimed in claim 6, wherein said metal chelate dyes are azo metal chelate dyes, formazane metal chelate dyes and dipyrromethene dyes.

8. An optical recording medium as claimed in claim 7, wherein the metal of said metal chelate dyes is selected from the group consisting of nickel, copper, cobalt, manganese and vanadium.

9. An optical recording medium as claimed in claim 6, wherein said polymethine dyes are trimethine cyanine dyes.

10. An optical recording medium as claimed in claim 6, wherein said azaannulene dyes are tetraazaporphyrin dyes.

11. An optical recording medium as claimed in claim 1, further comprising a reflective layer provided over said recording layer and including a metal selected from the group consisting of gold, silver, copper, aluminum or alloys thereof.

12. An optical recording medium as claimed in claim 3, and being, when recorded, reproduceable with a reproducing wavelength, wherein said recording layer, when formed by itself into a film, has a refractive index in the range of 1.5 to 3.0 and an extinction coefficient in the range of 0.02 to 0.2 both at a wavelength between ±5 nm from the reproducing wavelength.

13. An optical recording medium as claimed in claim 3, wherein said organic dye having the greatest maximum absorption wavelength is selected from the group consisting of methine dyes and polymethine dyes and wherein said other dyes are metal chelate dyes selected from the group consisting of azo metal chelate dyes, formazane metal chelate dyes and dipyrromethene dyes.

14. An optical recording medium as claimed in claim 13, wherein the metal of said metal chelate dyes is selected from the group consisting of nickel, copper, cobalt, manganese and vanadium.

15. An optical recording medium as claimed in claim 3, further comprising a reflective layer provided over said recording layer and including a metal selected from the group consisting of gold, silver, copper, aluminum or alloys thereof.

16. An optical recording medium as claimed in claim 3, wherein said substrate has a groove depth of 1000–2500 Å, a track pitch of 0.64–0.8 μm and a groove width of 0.18–0.40 μm in terms of half value width.

17. An optical recording medium as claimed in claim 3, wherein said recording layer has a decomposition initiation temperature of 360° C. or less.

18. An optical recording medium as claimed in claim 4, wherein said substrate has a wobble amplitude of Wo, and wherein the ratio Wo/PP is in the range of 0.1 to 0.4 where PP represents a push-pull amplitude.

19. An optical recording medium as claimed in claim 4, wherein said substrate has a groove depth of 1000–2500 Å, a track pitch of 0.64–0.8 μm and a groove width of 0.18µ0.40 μm in terms of half value width.

20. An optical recording medium as claimed in claim 4, wherein said organic dye is at least one dye selected from the group consisting of metal chelate dyes, polymethine dyes, squalelium dyes and azaannulene dyes.

21. An optical recording medium as claimed in claim 20, wherein said metal chelate dyes are azo metal chelate dyes, formazane metal chelate dyes and dipyrromethene dyes.

22. An optical recording medium as claimed in claim 21, wherein the metal of said metal chelate dyes is selected from the group consisting of nickel, copper, cobalt, manganese and vanadium.

23. An optical recording medium as claimed in claim 20, wherein said polymethine dyes are trimethine cyanine dyes and said azaannulene dyes are tetraazaporphyrin dyes.

24. An optical recording medium as claimed in claim 4, wherein said recording layer has a decomposition initiation temperature of 360° C. or less.

25. An optical recording medium as claimed in claim 4, further comprising a reflective layer provided over said recording layer and including a metal selected from the group consisting of gold, silver, copper, aluminum or alloys thereof.

26. An optical recording medium as claimed in claim 5, and having a land-groove distance d2 (Å), wherein the distance d2 satisfying the following relationship:

$$1200 \leq (d2) \times (PL) \leq 160000.$$

27. An optical recording medium as claimed in claim 5, wherein said substrate has a groove width W1 (μm), in terms of half value, satisfying the following relationship:

$$0.7 \leq (W1) \times (PL) \leq 40.$$

28. An optical recording medium as claimed in claim 5, wherein said substrate has a wobble amplitude W2 (Å) satisfying the following relationship:

$$2 \leq (W2)/(PL) \leq 500.$$

29. An optical recording medium as claimed in claim 5, wherein said substrate has a track pitch Tr (μm) satisfying the following relationship:

$$2 \leq (Tr) \times (PL) \leq 80.$$

30. An optical recording medium as claimed in claim 5, wherein said substrate has a wobble amplitude of Wo, and wherein the ratio Wo/PP is in the range of 0.1 to 0.4 where PP represents a push-pull amplitude.

31. An optical recording medium as claimed in claim 5, wherein said organic dye is at least one dye selected from the group consisting of metal chelate dyes, polymethine dyes, squalelium dyes and azaannulene dyes.

32. An optical recording medium as claimed in claim 31, wherein said metal chelate dyes are azo metal chelate dyes, formazane metal chelate dyes and dipyrromethene dyes.

33. An optical recording medium as claimed in claim 32, wherein the metal of said metal chelate dyes is selected from the group consisting of nickel, copper, cobalt, manganese and vanadium.

34. An optical recording medium as claimed in claim 31, wherein said polymethine dyes are trimethine cyanine dyes and said azaannulene dyes are tetraazaporphyrin dyes.

35. An optical recording medium as claimed in claim 5, wherein said recording layer has a decomposition initiation temperature of 360° C. or less.

36. An optical recording medium as claimed in claim 5, further comprising a reflective layer provided over said recording layer and including a metal selected from the group consisting of gold, silver, copper, aluminum or alloys thereof.

37. An optical recording medium as claimed in claim 1, and for use at a recording/reproducing wavelength between 630 nm and 690 nm.

38. An optical recording medium as claimed in claim 3, and for use at a recording/reproducing wavelength between 600 nm and 720 nm.

39. An optical recording medium as claimed in claim 4, and for use at a recording/reproducing wavelength between 600 nm and 720 nm.

40. An optical recording medium as claimed in claim 5, and for use at a recording/reproducing wavelength between 600 nm and 720 nm.

41. An optical recording medium as claimed in claim 1, and for use in multi-pulse recording.

42. An optical recording medium as claimed in claim 41, wherein the recording power and light emitting pulse length in each pulse are controlled in accordance with a recording position or with a recording linear speed.

43. An optical recording medium as claimed in claim 41, and for recording and reproducing data in accordance with a ZCAV (Zoned Constant Angular Velocity) format or a CAV (Constant Angular Velocity) format.

44. An optical recording medium as claimed in claim 1, and for use in rectangular wave recording wherein recording marks are formed by continuous light emission.

45. An optical recording medium as claimed in claim 44, wherein the recording power and light emitting pulse length in each pulse are controlled in accordance with a recording position or with a recording linear speed.

46. An optical recording medium as claimed in claim 44, and for recording and reproducing data in accordance with a ZCAV (Zoned Constant Angular Velocity) format or a CAV (Constant Angular Velocity) format.

47. An optical recording method comprising recording information on an optical recording medium according to claim 1, wherein two or more pulse series are used for forming plural kinds of mark lengths.

48. A method as claimed in claim 47, wherein the recording power and light emitting pulse length in each pulse are controlled in accordance with a recording position or with a recording linear speed.

49. A method as claimed in claim 47, wherein recording and reproducing are performed in accordance with a ZCAV (Zoned Constant Angular Velocity) format or a CAV (Constant Angular Velocity) format.

50. A method as claimed in claim 49, wherein recording/reproducing wavelength is between 630 nm and 690 nm.

51. An optical recording method comprising recording information on an optical recording medium according to claim 1, wherein recording marks are formed by rectangular waves of a continuous light emission.

52. A method as claimed in claim 51, wherein the recording power and light emitting pulse length in each pulse are controlled in accordance with a recording position or with a recording linear speed.

53. A method as claimed in claim 51, wherein recording and reproducing data are performed in accordance with a ZCAV (Zoned Constant Angular Velocity) format or a CAV (Constant Angular Velocity) format.

54. A method as claimed in claim 51, wherein recording/reproducing wavelength is between 600 nm and 720 nm.

55. An optical recording medium as claimed in claim 1, wherein said substrate has a wobble amplitude increasing in the radial direction.

56. An optical recording medium as claimed in claim 55, wherein said substrate has the highest wobble amplitude of Wo and the lowest wobble amplitude of Wi and wherein Wo/Wi is in the range of 1.05 to 1.40.

57. An optical recording medium as claimed in claim 55, wherein said substrate has a groove depth of 1000–2500 Å, a track pitch of 0.64–0.8 µm and a groove width of 0.18–0.40 µm in terms of half value width.

58. An optical recording medium as claimed in claim 55, and being, when recorded, reproduceable with a reproducing wavelength, wherein said recording layer, when formed by itself into a film, has a refractive index in the range of 1.5 to 3.0 and an extinction coefficient in the range of 0.02 to 0.2 both at a wavelength between ±5 nm from the reproducing wavelength.

59. An optical recording medium as claimed in claim 55, wherein said substrate has a groove depth d1 (Å) satisfying the following relationship:

$$4000 \leq (d1) \times (PL) \leq 240000$$

where PL is as defined above.

60. An optical recording medium as claimed in claim 55, and having a land-groove distance d2 (Å), wherein the distance d2 satisfying the following relationship:

$$1200 \leq (d2) \times (PL) \leq 160000.$$

61. An optical recording medium as claimed in claim 55, wherein said substrate has a groove width W1 (µm), in terms of half value, satisfying the following relationship:

$$0.7 \leq (W1) \times (PL) \leq 40.$$

62. An optical recording medium as claimed in claim 55, wherein said substrate has a wobble amplitude W2 (Å) satisfying the following relationship:

$$2 \leq (W2)/(PL) \leq 500.$$

63. An optical recording medium as claimed in claim 55, wherein said substrate has a track pitch Tr (µm) satisfying the following relationship:

$$2 \leq (Tr) \times (PL) \leq 80.$$

64. An optical recording medium as claimed in claim 55, wherein said organic dye is at least one dye selected from the group consisting of metal chelate dyes, polymethine dyes, squalelium dyes and azaannulene dyes.

65. An optical recording medium as claimed in claim 64, wherein said metal chelate dyes are azo metal chelate dyes, formazane metal chelate dyes and dipyrromethene dyes.

66. An optical recording medium as claimed in claim 65, wherein the metal of said metal chelate dyes is selected from the group consisting of nickel, copper, cobalt, manganese and vanadium.

67. An optical recording medium as claimed in claim 64, wherein said polymethine dyes are trimethine cyanine dyes and said 55, azaannulene dyes are tetraazaporphyrin dyes.

68. An optical recording medium as claimed in claim wherein said recording layer has a decomposition initiation temperature of 360° C. or less.

69. An optical recording medium as claimed in claim 55, further comprising a reflective layer provided over said recording layer and including a metal selected from the group consisting of gold, silver, copper, aluminum or alloys thereof.

70. An optical recording medium as claimed in claim 1, and for use at a recording/reproducing wavelength between 600 nm and 720 nm.

71. An optical recording medium as claimed in claim 1, wherein said substrate has a groove depth of 1000–2500 Å, a track pitch of 0.64–0.8 μm and a groove width of 0.18–0.40 μm in terms of half value width and wherein the groove depth increases in the radial direction.

72. An optical recording medium as claimed in claim 71, wherein the groove width increases in the radial direction.

73. An optical recording medium as claimed in claim and being, when recorded, reproduceable with a reproducing wavelength, wherein said recording layer, when formed by itself into a film, has a refractive index in the range of 1.5 to 3.0 and an extinction coefficient in the range of 0.02 to 0.2 both at a wavelength between ±5 nm from the reproducing wavelength.

74. An optical recording medium as claimed in claim 71, wherein said substrate has a wobble amplitude of Wo, and wherein the ratio Wo/PP is in the range of 0.1 to 0.4 where PP represents a push-pull amplitude.

75. An optical recording medium as claimed in claim 71, wherein said organic dye is at least one dye selected from the group consisting of metal chelate dyes, polymethine dyes, squalelium dyes and azaannulene dyes.

76. An optical recording medium as claimed in claim 75, wherein said metal chelate dyes are azo metal chelate dyes, formazane metal chelate dyes and dipyrromethene dyes.

77. An optical recording medium as claimed in claim 76, wherein the metal of said metal chelate dyes is selected from the group consisting of nickel, copper, cobalt, manganese and vanadium.

78. An optical recording medium as claimed in claim 75, wherein said polymethine dyes are trimethine cyanine dyes and said azaannulene dyes are tetraazaporphyrin dyes.

79. An optical recording medium as claimed in claim 71, wherein said recording layer has a decomposition initiation temperature of 360° C. or less.

80. An optical recording medium as claimed in claim 71, further comprising a reflective layer provided over said recording layer and including a metal selected from the group consisting of gold, silver, copper, aluminum or alloys thereof.

81. An optical recording medium as claimed in claim 71, and for use at a recording/reproducing wavelength between 600 nm and 720 nm.

82. A stamper for producing a replica substrate, having a surface providing such guide grooves on said substrate that have a wobble period length of 4T to 96T, an amplitude increasing in the radial direction, a highest wobble amplitude of Wo and a lowest wobble amplitude of Wi, wherein Wo/Wi is in a range of 1.05 to 1.40.

83. A stamper for producing a replica substrate, having a surface providing such guide grooves on said substrate that have a wobble period length of 4T to 96T, a groove depth of 1000–2500 Å, a track pitch of 0.64–0.8 μm and a groove width of 0.18–0.40 μm in terms of half value width, said groove depth increasing in the radial direction.

84. A stamper as claimed in claim 83, wherein said substrate has a guide groove width increasing in the radial direction.

\* \* \* \* \*